(12) United States Patent
Kasai

(10) Patent No.: US 8,876,357 B2
(45) Date of Patent: Nov. 4, 2014

(54) LIGHTING DEVICE, DISPLAY DEVICE AND TELEVISION RECEIVER

(75) Inventor: Nobuhiro Kasai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 346 days.

(21) Appl. No.: 13/395,825

(22) PCT Filed: Aug. 5, 2010

(86) PCT No.: PCT/JP2010/063258
§ 371 (c)(1),
(2), (4) Date: Mar. 13, 2012

(87) PCT Pub. No.: WO2011/036954
PCT Pub. Date: Mar. 31, 2011

(65) Prior Publication Data
US 2012/0176555 A1 Jul. 12, 2012

(30) Foreign Application Priority Data

Sep. 28, 2009 (JP) ................................. 2009-222961

(51) Int. Cl.
*F21V 7/04* (2006.01)
*G02F 1/1335* (2006.01)

(52) U.S. Cl.
CPC .... *G02F 1/133604* (2013.01); *G02F 1/133608* (2013.01); *G02F 1/133605* (2013.01); *G02F 2001/133628* (2013.01); *G02F 2201/36* (2013.01)
USPC ............................ 362/632; 362/633; 362/634

(58) Field of Classification Search
CPC ................ G02B 6/0085; G02B 6/0055; G02F 1/133608; G02F 2001/133314; G02F 2001/133317; G02F 2001/133628; G02F 2001/133311; G02F 2201/36
USPC .................................................. 362/632–634
See application file for complete search history.

(56) References Cited

U.S. PATENT DOCUMENTS

| 2005/0281037 A1* | 12/2005 | Murakami et al. ............ 362/382 |
| 2006/0109643 A1 | 5/2006 | Chang |
| 2009/0059562 A1 | 3/2009 | Maniwa et al. |
| 2009/0147175 A1* | 6/2009 | Tsumura et al. ................ 349/58 |

(Continued)

FOREIGN PATENT DOCUMENTS

| JP | 2002-304908 A | 10/2002 |
| JP | 2006-146126 A | 6/2006 |

(Continued)

OTHER PUBLICATIONS

Official Communication issued in International Patent Application No. PCT/JP2010/063258, mailed on Nov. 9, 2010.

*Primary Examiner* — William Carter
(74) *Attorney, Agent, or Firm* — Keating & Bennett, LLP

(57) ABSTRACT

The invention is intended to provide a lighting device that shortens time required to obtain peak brightness. A backlight unit 16 according to the invention includes: cold cathode tubes 22 as a light source; a chassis 18 housing the cold cathode tubes 22; a reflection sheet 21 disposed within the chassis 18 and reflecting light; and a heat insulator 27 disposed between the chassis 18 and the reflection sheet 21. Because the heat insulator 27 is disposes between the chassis 18 and the reflection sheet 21, heat in the chassis 18 is less likely to escape to the outside. Therefore, the temperature inside the chassis 18 can be efficiently increased with the heat generated by the cold cathode tubes 22.

22 Claims, 15 Drawing Sheets

(56) References Cited

U.S. PATENT DOCUMENTS

2009/0303411 A1* 12/2009 Kawato et al. ............... 362/341
2010/0066937 A1*  3/2010 Yamashita et al. ............ 349/58
2010/0253705 A1* 10/2010 Maeda ........................ 345/690

FOREIGN PATENT DOCUMENTS

| JP | 2008-41492 A | 2/2008 |
| JP | 2008-165101 A | 7/2008 |
| JP | 2010-72262 A | 4/2010 |

* cited by examiner

LIGHTING DEVICE, DISPLAY DEVICE AND TELEVISION RECEIVER

TECHNICAL FIELD

The present invention relates to a lighting device, a display device, and a television receiver.

BACKGROUND ART

Liquid crystal panels for use in liquid crystal display devices such as a liquid crystal television set, for example, do not emit light by themselves and therefore need backlight units as separate lighting devices. The backlight units are well known for being mounted on a back surface of a liquid crystal panel (opposite to a display surface) and are configured to include a chassis having an opening in the surface facing the liquid crystal panel; a large number of light sources (for example, cold cathode tubes) stored as lamps in the chassis; an optical member (diffuser plate or the like) that is disposed in the opening of the chassis and efficiently emits light from the light sources toward the liquid crystal panel; and a reflection sheet that is laid in the chassis and reflects the light from the light sources toward the optical member and the liquid crystal panel. In addition, as an example of this kind of a backlight unit, there is a well-known backlight unit disclosed in Patent Document 1 shown below.

Patent Document 1: Japanese Unexamined Patent Publication No. 2006-146126

Problem to be Solved by the Invention

In recent years, there are tendencies of demanding lower power consumption of a backlight unit. To attain the object, some measures may be taken such as reducing an amount of current to be supplied to cold cathode tubes, decreasing the number of cold cathode tubes to be mounted in the backlight unit, or the like. However, all of these measures lead to reduction in an amount of heat generation of the cold cathode tubes, and therefore may cause the following problem. Each of the cold cathode tubes has temperature characteristics. The brightness varies substantially proportional to an ambient temperature while a state of the cold cathode tube changes from a low-temperature state to an optimum temperature state. In the optima temperature state, peak brightness is obtained. If an amount of heat generation of the cold cathode tube is reduced, a longer period of time is required to obtain the peak brightness after the cold cathode tube is turned on in the low-temperature state.

DISCLOSURE OF THE INVENTION

The invention is completed under the foregoing circumstances, and an object of the invention is to shorten the time required to obtain the peak brightness.

Means for Solving the Problem

A lighting device according to the invention includes a light source, a chassis housing the light source, a reflection sheet disposed in the chassis and reflecting light, and a heat insulator disposed between the chassis and the reflection sheet.

With this configuration, beams of light emitted from the light source and headed toward the reflection sheet are effectively reflected by the reflection sheet and output. Incidentally, the light source has temperature characteristics, that is, characteristics that brightness varies in accordance with an ambient temperature. In some cases, the light source has temperature characteristics that brightness varies proportional to an ambient temperature. When such light source is used, time required to obtain the peak brightness after the light source is turned on significantly depends on the ambient temperature, that is, mainly on an amount of heat generated by the light source itself.

To reduce the power consumption of the lighting device, some measures may be taken such as decreasing the number of light sources in the lighting device and reducing an amount of current supplied to the light source. If any of the foregoing measures is taken, an amount of heat generated by the light source tends to decrease. Accordingly, a longer period of time may be required to obtain the peak brightness after the light source is turned on.

According to the invention, a heat insulator is disposed between the chassis and the reflection sheet, and therefore heat in the chassis is less likely to escape to the outside. Namely, the inside temperature of the chassis can be efficiently increased with heat generated by the light source. With this configuration, the time required to increase the inside temperature to an optimum temperature at which the peak brightness is obtained after the light source is turned on can be shortened. The invention is especially effective when the light source is turned on in a lower-temperature condition.

In the present invention, the heat insulator that is a separate component from the reflection sheet is used. With this configuration, a material having high light reflectivity can be used for the reflection sheet and a material having high heat insulating properties can be used for the light insulator. Namely, the materials for the reflection sheet and the heat insulator can be flexibly selected. Therefore, the reflection sheet having high light reflectivity and the heat insulator having high heat insulating properties can be provided. When a decrease in the brightness of the light from the lighting device may be concerned due to a reduction in power consumption, the light use efficiency can be improved with the reflection sheet having high light reflectivity. As a result, the reduction in brightness of the light is less likely to occur. Namely, this configuration brings a favorable effect. Furthermore, the heat insulator is arranged between the chassis and the reflection sheet. Therefore, the heat insulator is least likely to be exposed on the light source side and thus the heat insulator is less likely to be recognized as a dark spot. The heat insulator is least likely to be exposed on the outside of the chassis. Therefore, the heat insulator is properly protected. Moreover, the heat insulator is pressed by the reflection sheet. Therefore, the heat insulator is properly installed.

BEST MODE FOR CARRYING OUT THE INVENTION

<First Embodiment>

Figure 2:
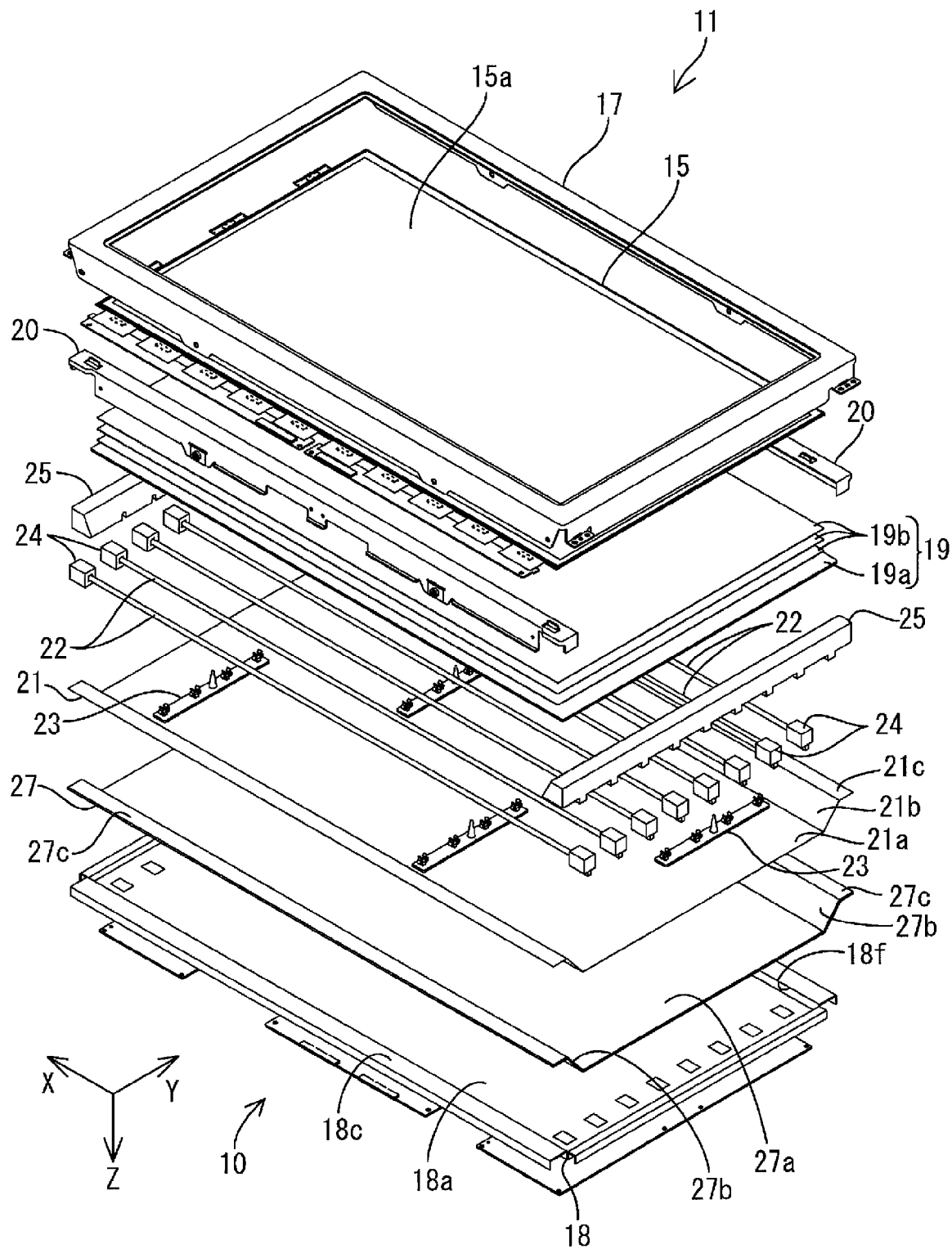
FIG. 2 is an exploded perspective view of a schematic configuration of a liquid crystal display module included in the television receiver.
Figure 3:
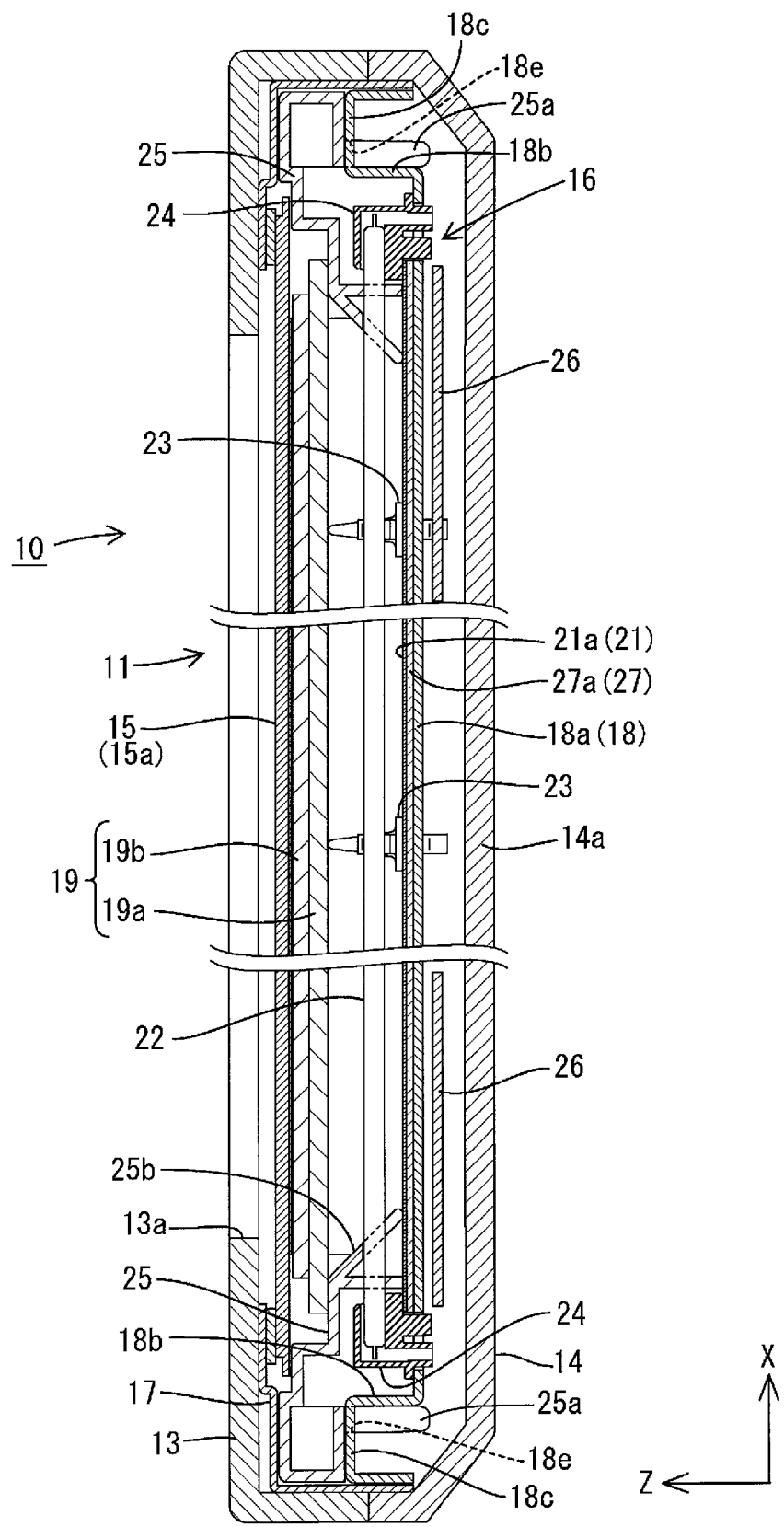
FIG. 3 is a cross section view of the liquid crystal display device along a longer side.
Figure 4:
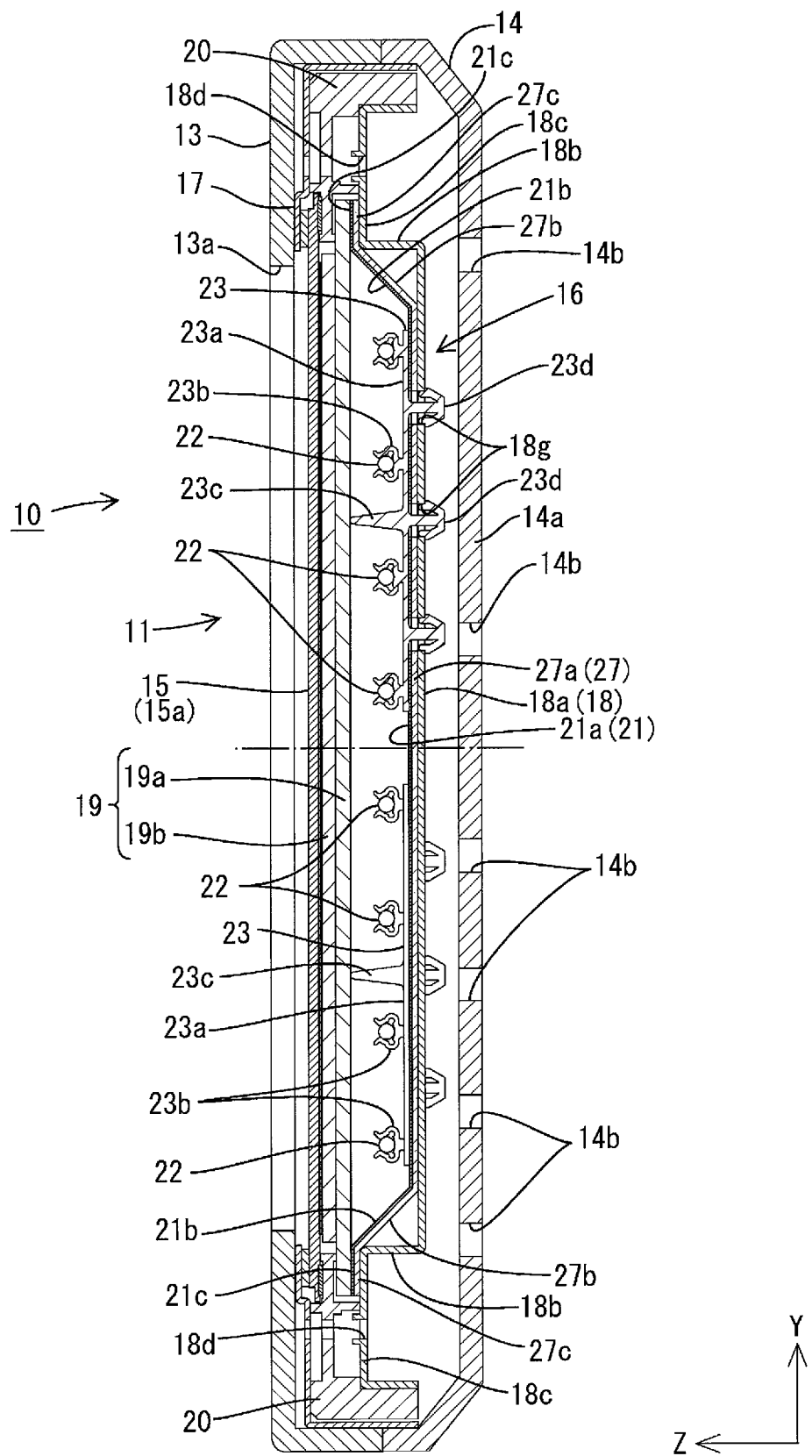
FIG. 4 is a cross section view of the liquid crystal display device along a shorter side.
Figure 5:
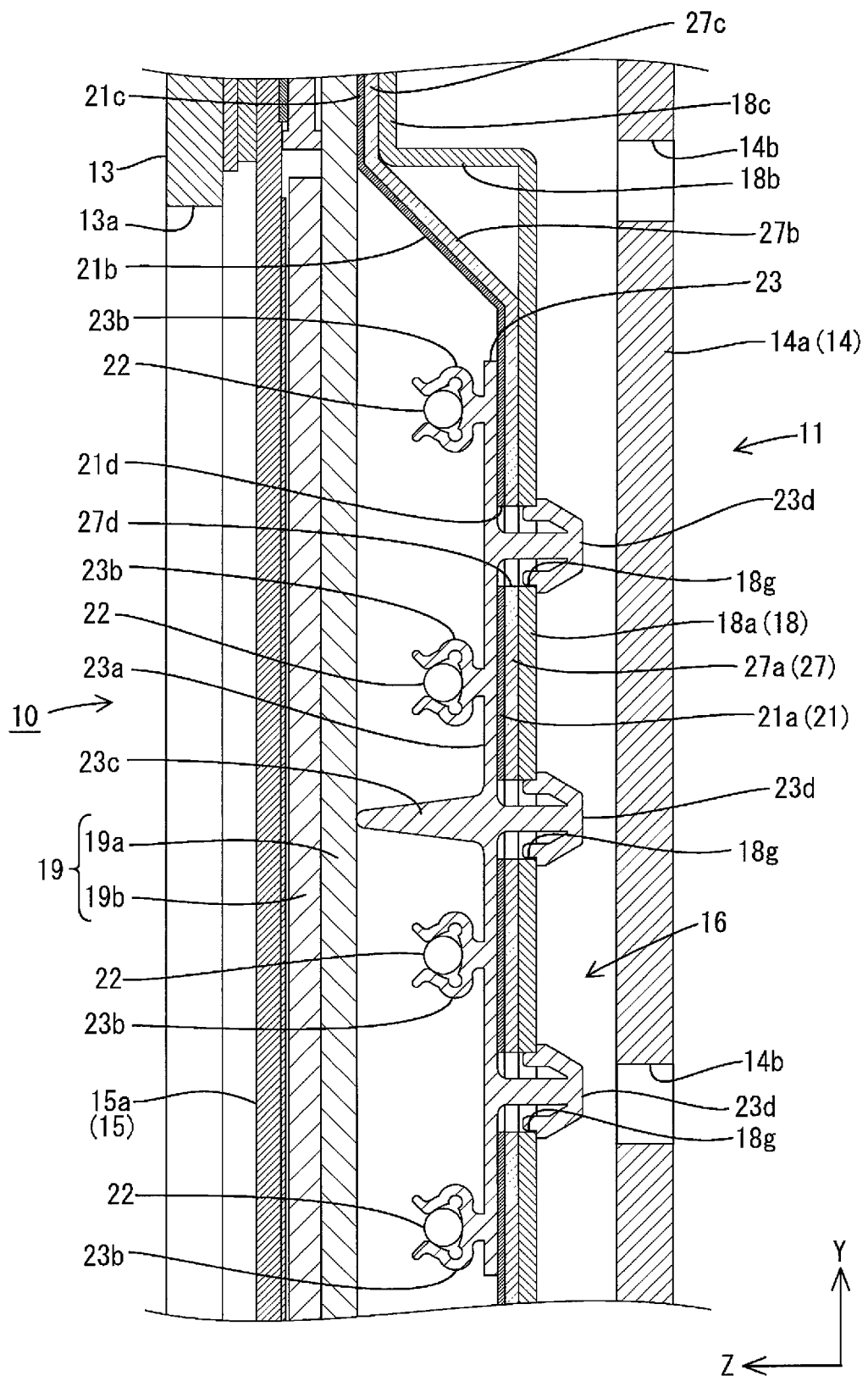
FIG. 5 is an enlarged view of main part of FIG. 4.

A first embodiment of the invention will be described with reference to FIGS. 1 to 8. In the embodiment, a liquid crystal display device 10 including a liquid crystal panel 11 is represented. Some of the drawings include an X-axis, a Y-axis, and a Z-axis which show respective directions shown in the drawings. Of the directions, a Y-axis direction is aligned with a vertical direction, and an X-axis direction is aligned with a horizontal direction. Upward and downward directions are described with respect to the vertical direction unless otherwise indicated. In addition, the left side shown in FIGS. 3 to 5 is a front side, and the right side shown in the same is a back side.

Figure 1:
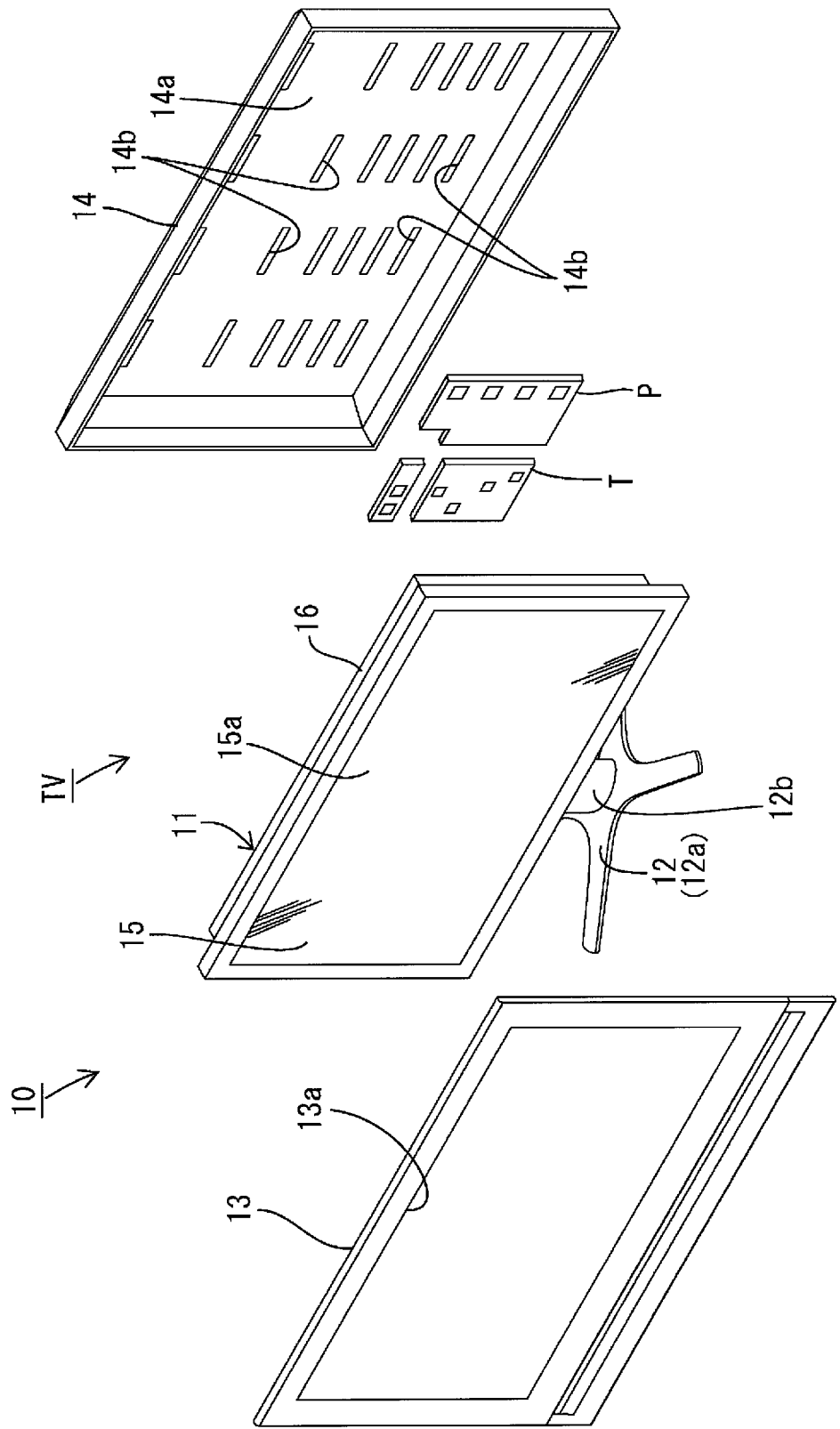
FIG. 1 is an exploded perspective view of a schematic configuration of a television receiver according to a first embodiment of the invention.

The liquid crystal display device 10 according to the embodiment includes a liquid crystal display module 11; a stand 12 (support member) supporting the liquid crystal display module 11 with a display surface 15a thereof along the vertical direction (Y-axis direction); and a pair of exterior members 13 and 14 housing the liquid crystal display module 11, as shown in FIG. 1. When a power source P and a tuner T and the like are housed and installed in the exterior members 13 and 14 in the liquid crystal display device 10, a television receiver TV configured to receive television signals and display television images, is completed.

A configuration of the liquid crystal display module 11 will first be described in detail. As shown in FIG. 2, the liquid crystal display module 11 has a horizontally-long square shape as a whole, and includes a liquid crystal panel 15 as a display panel (display element) and a backlight unit 16 (lighting device) as an external light source, which are integrally held by a bezel 17 or the like.

The liquid crystal panel 15 has a rectangular shape in a plan view with a display surface 15a along the horizontal direction (X-axis direction) and the vertical direction (Y-axis direction). The liquid crystal panel 15 also has a longer side aligned with the horizontal direction and a shorter side aligned with the vertical direction. The liquid crystal panel 15 is formed by attaching together a pair of glass substrates with a predetermined gap therebetween and encapsulating liquid crystal between the glass substrates. One of the glass substrates is provided with a switching component (TFT, for example) connected to a source wiring and a gate wiring perpendicular to each other, pixel electrodes connected to the switching component, and an alignment film, and the like. The other glass substrate is provided with a color filter in which colored portions of R (red), G (green), and B (blue) and the like are arranged in a predetermined alignment, counter electrodes, and an alignment film, and the like. Image data and various control signals needed to display images, are supplied to the source wiring, the gate wiring, the counter electrodes, and the like. Polarizing plates (not shown) are disposed on the outside of the glass substrates.

The backlight unit 16 includes an approximately box-shaped chassis 18 opened on the front side (the display surface 15a side, the light output side, and the liquid crystal panel 15 side); an optical member 19 disposed so as to cover an opening 18f of the chassis 18; and a pair of frames 20 disposed along a longer side of the chassis 18 and holding a longer side edge portion of the optical member 19 between the frames 20 and the chassis 18. The chassis 18 includes a reflection sheet 21 reflecting light; cold cathode tubes 22 as a light source; lamp clips 23 configured to hold the cold cathode tubes 22; relay connectors 24 relaying electrical connections at end portions of the cold cathode tubes 22; and holders 25 covering collectively the end portions of the cold cathode tubes 22 and the relay connectors 24. In the backlight unit 16, the optical member 19 side of the cold cathode tubes 22 is the light output side.

The chassis 18 is made of metal (iron or aluminum, for example), and is formed in an approximately shallow box shape including: a bottom plate 18a; side plates 18b rising frontward from end portions of sides of the bottom plate 18a; and receiving plates 18c jutting outward from distal ends of the side plates 18b, as shown in FIGS. 3 and 4. The bottom plate 18a has a rectangular shape (longitudinal) with a longer side and a shorter side aligned with the liquid crystal panel 15 and the optical member 19, and has a range of formation so as to be substantially the same in size as the liquid crystal panel 15 and the optical member 19 in a plan view. The bottom plate 18a has a main plate surface in parallel with the display surface 15a of the liquid crystal panel 15. The bottom plate 18a has insertion holes through which the relay connectors 24 are inserted at both end portions along the longer side. The side plates 18b are provided in pairs on the bottom plate 18a at the both end portions along the longer side and at the both end portions along the shorter side. The receiving plates 18c are formed on each of the side plates 18b and are configured to be parallel with the bottom plate 18a. Outer end portions of the optical member 19 and the like are placed on the receiving plates 18c that are configured to receive these portions from the back side. In addition, as shown in FIG. 4, the receiving plate 18c has fixed holes 18d through which the bezel 17, the frame 20, the chassis 18, and others, can be integrated by screws or the like, for example.

The reflection sheet 21 is made of synthetic resin (PET, for example) and has a surface of a white color excellent in light reflectivity. The reflection sheet 21 is disposed on the inner surface (facing the cold cathode tubes 22) of the chassis 18 so as to cover the almost entire inner surface, as shown in FIG. 2. The reflection sheet 21 makes it possible to reflect light emitted from the cold cathode tubes 22 toward the optical member 19. The reflection sheet 21 has a rectangular shape (longitudinal) with a longer side and a shorter side aligned with the chassis 18 as a whole, and is made symmetrical about the shorter side. As shown in FIG. 4, the reflection sheet 21 is formed by a bottom portion 21a disposed along the bottom plate 18a of the chassis 18; a pair of rising portions 21b rising from the ends of the bottom portion 21a toward the front side (light output side) and inclined with respect to the side plates 18b; and a pair of extending portions 21c extending outward from rising ends (opposite to the bottom portion 21a) of the rising portions 21b and disposed along the receiving plates 18c.

As shown in FIG. 2, the optical member 19 has a horizontally-long square shape (rectangular) in a plan view, as with the liquid crystal panel 15 and the chassis 18. The optical member 19 intervenes between the liquid crystal panel 15 and the cold cathode tubes 22, and is formed by the diffuser plate 19a disposed on the back side (opposite to the cold cathode tube 22 side and the light output side) and an optical sheet 19b disposed on the front side (the liquid crystal panel 15 side and the light output side). The diffuser plate 19a is formed by dispersing a large number of diffusing particles in an substantially transparent resin base substrate with a predetermined thickness. The diffuser plate 19a has the function of diffusing transmitted light. The optical sheet 19b is formed as a thin sheet as compared to the diffuser plate 19a, and has a three-layered structure. Specifically, the optical sheet 19b has a diffuser sheet, a lens sheet, and a reflection type polarizing sheet in this order from the diffuser plate 19a side (back side).

The frames 20 are made of metal (iron or aluminum, for example), and are configured to extend along the longer side of the chassis 18 as shown in FIGS. 2 and 4, and are attached to the receiving plates 18c on the front side at the longer side of the chassis 18. The frames 20 and the receiving plates 18c are configured to hold therebetween the longer side edge portions of the optical member 19 and the extending portions 21c of the reflection sheet 21. In addition, the frames 20 are also configured to receive the longer side edge portions of the liquid crystal panel 15 from the back side.

A plurality (eight in the embodiment) of cold cathode tubes 22 has a long and narrow tubular shape, and is housed in the chassis 18 so as to be aligned almost in parallel with each other with a longitudinal side aligned with the longer side (the X-axis direction and the horizontal direction) of the chassis 18, as shown in FIGS. 2 to 4. The direction in which the cold cathode tubes 22 are in parallel, is aligned with the Y-axis direction, that is, the vertical direction. When the cold cathode tubes 22 are held by the lamp clips 23, the cold cathode tubes 22 are supported with slight space between the cold cathode tubes 22 and the bottom plate 18a (reflection sheet 21) of the chassis 18. The cold cathode tubes 22 have end portions which are fitted into the relay connectors 24 and electrically connected via the relay connectors 24 to the inverter substrate 26 attached to the outer surface (back surface) of the bottom plate 18b of the chassis 18. The inverter substrate 26 makes it possible to control illumination of the cold cathode tubes 22. In addition, the holders 25 are attached so as to cover the end portions of the cold cathode tubes 22 and the relay connectors 24.

The holders 25 are made of synthetic resin of a white color and has a long and narrow, approximately box-like shape extending along the shorter side of the chassis 18, as shown in FIG. 3. The holders 25 each have a stepped surface on a front side on which the diffuser plate 19a and the liquid crystal panel 15 can be placed in different levels. The holders 25 are arranged so as to partially overlap the receiving plates 18c of the chassis 18 along the shorter side, thereby forming side walls of the backlight unit 16 together with the receiving plates 18c along the shorter side. Insertion pins 25a protrude from surfaces of the holders 25 facing the receiving plates 18c of the chassis 18. When the insertion pins 25a are inserted into insertion holes 18e formed in the upper surfaces of the receiving plates 18c of the chassis 18, the holders 25 are attached to the chassis 18. Inclined covers 25b inclined toward the bottom plate 18a of the chassis 18, extend from receiving surfaces of the holders 25 receiving the diffuser plate 19a.

The lamp clips 23 are each formed by a body portion 23a extending along the bottom plate 18a of the chassis 18 (the bottom portion 21a of the reflection sheet 21); lamp holding portions 23b protruding frontward from the body portion 23a and configured to hold the cold cathode tubes 22; a support portion 23c protruding frontward from the body portion 23a and configured to support the diffuser plate 19a from the back side; and attachment portions 23d protruding backward from the body portion 23a and attached to the bottom plate 18a, as shown in FIG. 4. The body portion 23a has a plate-like shape and is configured to hold the bottom portion 21a of the reflection sheet 21 between the body portion 23a and the bottom plate 18a of the chassis 18. The body portion 23a has a rectangular shape in a plan view, and is attached to the chassis 18 so as to have a longer side aligned with the Y-axis direction (the direction in which the cold cathode tubes 22 are arranged in parallel).

The lamp holding portions 23b are aligned in parallel at four positions with predetermined space therebetween at the body portion 23a along the longer side as shown in FIG. 5, and the alignment pitch of the lamp holding portions 23b is identical to the alignment pitch of the cold cathode tubes 22. The lamp holding portions 23b each have a pair of arm parts, and are configured to attach or detach the cold cathode tubes 22 through the space between leading ends of the arm parts. The both arm parts are configured to be elastically deformable while being opened outward on attachment or detachment of the cold cathode tube 22, and are configured to elastically hold the cold cathode tube 22 therebetween. The lamp holding portions 23b makes it possible to keep the cold cathode tubes 22 in a straight state relative to the axial direction and maintain a constant positional relationship between the cold cathode tubes 22 and the diffuser plate 19a relative to the Z-axis direction.

The support portion 23c is configured to support the optical member 19 from the back side, that is, from the cold cathode tube 22 side, whereby it is possible to regulate a constant positional relationship (distance and space) between the optical member 19 (in particular, the diffuser plate 19a) and the cold cathode tubes 22 along the Z-axis direction (perpendicular to the plate surface of the optical member 19). This allows the optical member 19 to exhibit desired optical performance in a stable manner. The support portion 23c is positioned at an approximately center of the body portion 23a along the longer side. The support portion 23c has a circular conical shape with an axial direction aligned with the Z-axis direction (approximately perpendicular to the plate surface of the diffuser plate 19a) as a whole. Specifically, the support portion 23c has a circular shape in cross section and is tapered such that a radius thereof becomes gradually smaller from a protruding base end to a protruding leading end.

The attachment portions 23d are configured to hold the lamp clips 23 in a state of being attached to the chassis 18, by being inserted into and locked at the attachment holes 18g formed in the bottom plate 18a of the chassis 18. The attachment portions 23d are disposed on the body portion 23a at three positions separated from each other along the longer side, and the one in the middle overlaps the support portion 23c in a plan view. The attachment portions 23d have lock pieces configured to be deformable in the process of insertion into the attachment holes 18g. When the lock pieces are retained from the back side at the edge portions of the attachment holes 18g, the lamp clips 23 can be held in a state of being attached to the chassis 18. In addition, the bottom portion 21a of the reflection sheet 21 has insertion holes 21d communicating with the attachment holes 18g and configured to allow insertion of the attachment portions 23d, at positions corresponding to the attachment holes 18g.

Figure 6:
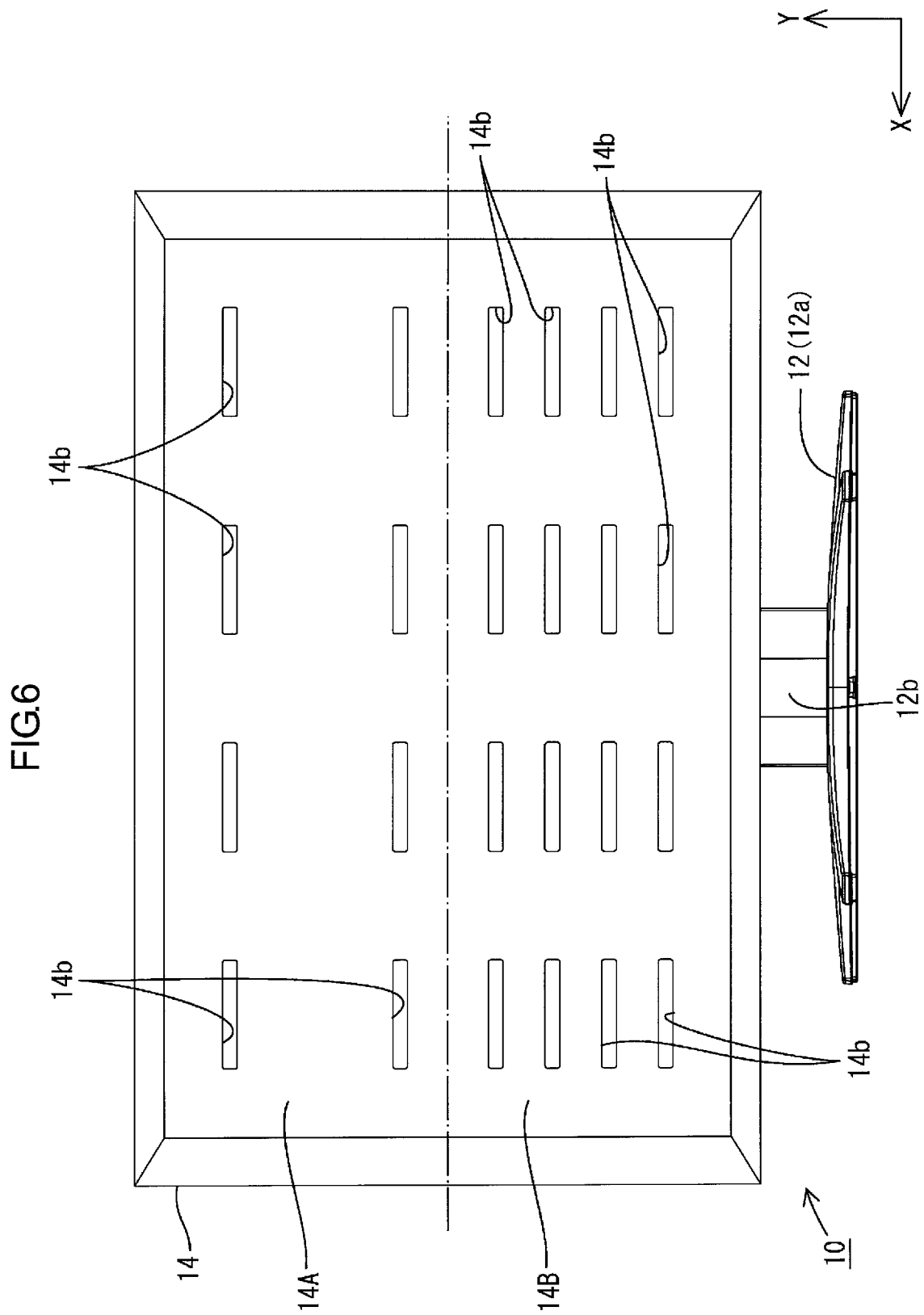
FIG. 6 is a rear view of the liquid crystal display device.

The stand 12 supporting the liquid crystal display module 11 configured as described above, has a pedestal portion 12a placed directly on an installation surface of the liquid crystal display device 10; and a shaft portion 12b rising from the pedestal portion 12a along the vertical direction, as shown in FIGS. 1 and 6. The shaft portion 12b is attached to the back side of the chassis 18 constituting the liquid crystal display module 11. The stand 12 allows the liquid crystal display module 11 to be supported with the display surface 15a along the Y-axis direction, that is, the vertical direction. In this support state, the cold cathode tubes 22 have the axial direction along the horizontal direction, and the direction of alignment of the cold cathode tubes 22 is aligned with the vertical direction (FIGS. 3 and 4). In FIGS. 2 to 5, the stand 12 is not shown.

In the embodiment, "the display surface 15a of the liquid crystal display module 11 along the vertical direction" is not limited to the manner the display surface 15a of the liquid crystal display module 11 in parallel with the vertical direction. The display surface 15a may be disposed in a direction relatively along the vertical direction, with respect to a direction along the horizontal direction. For example, the display surface 15a may be inclined at 0 to 45 degrees, preferably 0 to 30 degrees, with respect to the vertical direction.

The pair of exterior members 13 and 14 housing the liquid crystal display module 11 configured as described above are made of synthetic resin, and are formed by a first exterior member 13 disposed on the front side (display surface 15a side) of the liquid crystal display module 11; and a second exterior member 14 disposed on the back side (opposite to the display surface 15a side) of the same, as shown in FIG. 1. In other words, the liquid crystal display module 11 is held at a predetermined position along the thickness direction (the Z-axis direction) between the pair of exterior members 13 and 14 divided along the display surface 15a. The first exterior member 13 is provided with a display opening 13a allowing the display surface 15a of the display module 11 to be exposed to the outside at the front side. Meanwhile, the second exterior member 14 has a shallow box-like shape opened on the front side, and has a bottom portion 14a with a plurality of penetrating heat release holes 14b for heat release.

Figure 7:
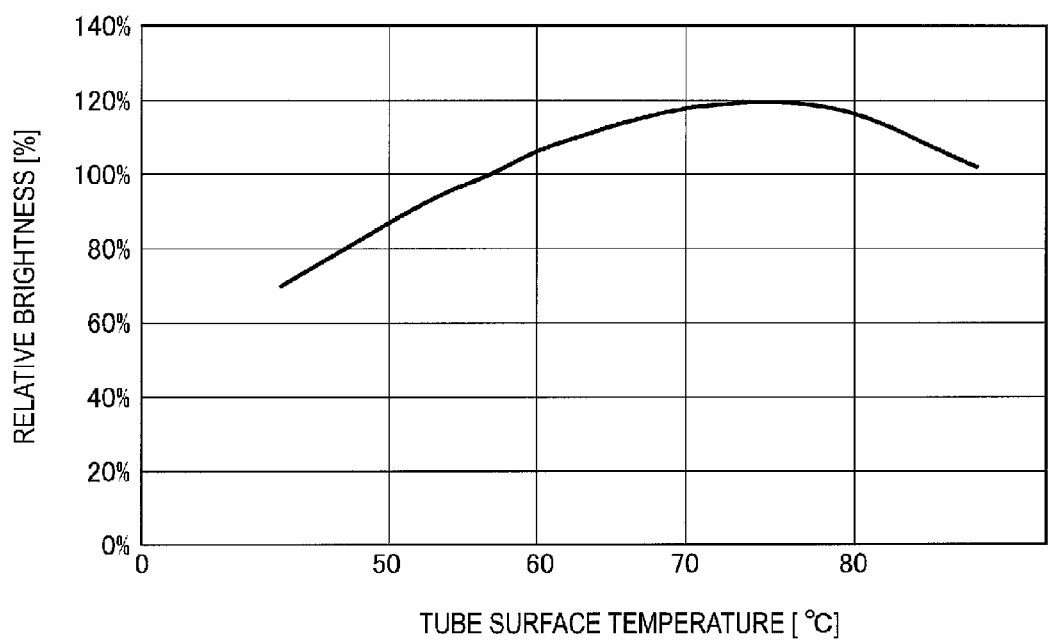
FIG. 7 is a graph showing changes in brightness on cold cathode tubes with respect to a tube surface temperature.

Temperature characteristics of the cold cathode tubes 22 will be described here. The cold cathode tubes 22 have mercury encapsulated therein, and vapor pressure of mercury depends largely on temperature, and therefore brightness of the cold cathode tubes 22 have temperature dependence. Specifically, the brightness of the cold cathode tubes 22 tends to rise until the tube surface temperature reaches 75° C. and decrease after having exceeded 75° C., as shown in FIG. 7. That is, 75° C. at which peak brightness is obtained is the optimum temperature of the cold cathode tubes 22 according to the embodiment. At temperatures lower than the optimum temperature, it is considered that excitation probability decreases due to lack of vapor pressure of mercury to lower luminous efficiency, thereby causing lowering in brightness. In addition, at temperatures higher than the optimum temperature, it is considered that the ultraviolet ray is absorbed by mercury again, thereby lowering the luminance efficiently. The tube surface temperature of the cold cathode tubes 22 varies according to the ambient temperature. Therefore, in order to maintain high brightness of the cold cathode tubes 22, proper control of the ambient temperature is required for setting the tube surface temperature to the optimum temperature.

Meanwhile, it is conceived that lower power consumption at the backlight unit 16 and the liquid crystal display device 10 can be achieved by reducing an amount of current to be supplied to the cold cathode tubes 22 or decreasing the number of the cold cathode tubes 22, for example. All of these measures can reduce an amount of heat generation of the cold cathode tubes 22, which may cause a problem as described below. Specifically, the cold cathode tubes 22 have the temperature characteristic as described above, and therefore a reduced amount of heat generation of the cold cathode tubes 22 may lead to the necessity of much more time between the instant when the cold cathode tubes 22 are illuminated under low-temperature environments and the instant when the cold cathode tubes 22 reach the optimum temperature.

Therefore, in the embodiment, a heat insulator 27 is disposed between the chassis 18 and the reflection sheet 21, which makes heat in the chassis 18 less prone to escape to the outside. With this configuration, the temperature in the chassis 18 can be efficiently raised even if there is a small amount of heat generation of the cold cathode tubes 22, whereby it is possible to shorten time between the instant when the cold cathode tubes 22 start illumination and the instant when the cold cathode tubes 22 reach the optimum temperature. Hereinafter, the heat insulator 27 will be described in detail.

The heat insulator 27 is made of foamed resin material (foamed urethane, for example), and is smaller in heat conductivity than the chassis 18 and the reflection sheet 21. Specifically, the heat conductivity of the heat insulator 27 is preferably 0.06 W/mK or less. The foamed resin material constituting the heat insulator 27 is formed by encapsulating a foamed gas smaller in heat conductivity than the air into synthetic resin as abase substrate and dispersing numerous small air bubbles into the resin.

As shown in FIG. 2, the heat insulator 27 has an outer shape following the reflection sheet 21 as a whole, and is formed by a bottom portion 27a disposed along the bottom plate 18a of the chassis 18; a pair of rising portions 27b rising from ends of the bottom portion 27a toward the front side (the light output side) and inclined with respect to the side plates 18b; and a pair of extending portions 27c extending outward from rising ends (opposite to the bottom portion 27a side) of the rising portions 27b and disposed along the receiving plates 18c. The bottom portion 27a extends so as to cover the substantially entire bottom plate 18a, and is substantially the same in size as the bottom portion 21a of the reflection sheet 21. The bottom portion 27a has insertion holes 27d communicating with the insertion holes 21d in the reflection sheet 21, which are configured to allow insertion of the attachment portions 23d of the lamp clips 23. In addition, the bottom portion 27a and the bottom portion 21a of the reflection sheet 21 are sandwiched between the bottom plate 18a of the chassis 18 and the body portion 23a of the lamp clips 23. The rising portions 27b extend so as to cover the almost entire side plates 18b, and are substantially the same in size as the rising portions 21b of the reflection sheet 21. The extending portions 27c extend so as to cover the almost entire receiving plates 18c and are substantially the same in size as the extending portions 21c of the reflection sheet 21.

As in the foregoing, the heat insulator 27 is substantially the same in size as the reflection sheet 21 in a plan view, and is placed over the almost entire reflection sheet 21 and chassis 18. In other words, the heat insulator 27 is entirely sandwiched between the chassis 18 and the reflection sheet 21. Therefore, the almost entire heat insulator 27 is covered by the reflection sheet 21 from the front side, and thus is hardly exposed in the chassis 18 (on the cold cathode tube 22 side). In other words, the almost entire reflection sheet 21 is exposed in the chassis 18, which allows the reflection sheet 21 to efficiently reflect light toward the optical member 19 (on the liquid crystal panel 15 side) in the chassis 18. Similarly, the heat insulator 27 is almost entirely covered by the chassis 18, and is hardly exposed outside the chassis 18 (on the second exterior member 14 side).

As described above, the backlight unit 16 according to the embodiment is configured such that the heat insulators 27 makes heat in the chassis 18 less prone to escape to the outside. However, the cold cathode tubes 22 have the temperature characteristic that brightness becomes low if temperature of the cold cathode tubes 22 exceeds the optimum temperature, as shown in FIG. 7, and there is a need to suppress excessive temperature rise. With this configuration, in the embodiment, of the exterior members 13 and 14 constituting the liquid crystal display device 10, the second exterior member 14 disposed on the back side of the chassis 18 has the heat release holes 14b penetrating the bottom portion 14a, as shown in FIGS. 4 and 6. The heat release holes 14b have a longitudinally long, approximately oval shape in a plan view, and have a long axis direction aligned with the X-axis direction (horizontal direction). The heat release holes 14b are disposed in parallel in a matrix at the bottom portion 14a, and are identical in opening area and outer shape. Distributing air inside and outside the exterior members 13 and 14 through the heat release holes 14b makes it possible to realize heat release and suppress excessive temperature rise.

Incidentally, if the heat release holes 14b exert excessive heat release performance, the heat insulating effect of the heat insulators 27 can be deteriorated. Therefore, it is preferred that the heat release performance of the heat release holes 14b is set in an appropriate manner. For this end, it is important to decide how to arrange the heat release holes 14b in a surface of the bottom portion 14a of the second exterior member 14, that is, how to set distribution of the heat release holes 14b. Here, the liquid crystal display device 10 is supported by the stand 12 with the display surface 15a along the vertical direction, and therefore, air convects upward and downward along the vertical direction and temperature tends to be higher on the upper side of the vertical direction than the lower side of the same in the exterior members 13 and 14. In the embodiment, considering this point, the second exterior member 14 is configured such that, if the second exterior member 14 is divided into an upper portion 14A and a lower portion 14B with the center along the vertical direction (shown by an alternate long and short dash line in FIGS. 4 and 6) as a boundary therebetween, the opening area of the heat release holes 14b at the upper portion 14A is smaller than the opening area of the heat release holes 14b at the lower portion 14B, as shown in FIG. 6. Specifically, the heat release holes 14b are identical in opening area and outer shape, and thus the number of the heat release holes 14b disposed at the upper portion 14A is smaller than the number of the heat release holes 14b disposed at the lower portion 14B. Further specifically, 16 heat release holes 14b are disposed at the lower portion 14B, whereas eight heat release holes 14b are disposed at the upper portion 14A, which is half of the ones at the lower portion 14B. The heat release holes 14b are disposed at the lower portion 14B with almost equal alignment pitches along the Y-axis direction, but the heat release holes 14b are disposed at the upper portion 14A with larger alignment pitches on upper sides. As in the foregoing, setting distribution of opening area of the heat release holes 14b at the second exterior member 14 makes it possible to suppress outflow of air from the heat release holes 14b at the upper portion 14A, thereby suppressing excessive release of heat in the exterior members 13 and 14.

The embodiment is structured as described above, and subsequently an operation of the embodiment will be described. To manufacture the liquid crystal display device 10, the separately fabricated liquid crystal panel 15, backlight unit 16, bezel 17, and the like, are built up to manufacture the liquid crystal display module 11, and then the two exterior members 13 and 14 are assembled into the liquid crystal display module 11. In addition, placing a power source P, a tuner T, and the like into the two exterior members 13 and 14, makes it possible to obtain a television receiver TV. The procedure for manufacturing the liquid crystal display device 10 will be described below.

The heat insulator 27 and the reflection sheet 21 are sequentially laid in the chassis 18. With this configuration, the heat insulator 27 is sandwiched between the reflection sheet 21 and the chassis 18 (FIGS. 3 and 4). Then, the lamp clips 23 are attached to the chassis 18. The attachment portions 23d of the lamp clips 23 are inserted into the corresponding insertion holes 21d and 27d of the reflection sheet 21 and the heat insulator 27, and then are passed through the attachment holes 18g, whereby the attachment portions 23d are locked at the hole edges from the back side (FIG. 5). With this configuration, the lamp clips 23 are held so as not to come off from the chassis 18, and the respective bottom portions 21a and 27a of the reflection sheet 21 and the heat insulators 27 are collectively sandwiched between the body portion 23a and the bottom plate 18a. After that, the cold cathode tubes 22 with the relay connectors 24 attached to the both end portions are housed in the chassis 18, and the relay connectors 24 are attached to the bottom plate 18a, and the cold cathode tubes 22 are held by the lamp holding portions 23b (FIGS. 3 and 4). Subsequently, the holders 25 are attached so as to cover the end portions of the cold cathode tubes 22 and the relay connectors 24, and the optical members 19 are sequentially placed on the holders 25, and then the frame 20 is attached to thereby obtain the backlight unit 16. After that, the liquid crystal panel 15 is placed on the frame 20 and the bezel 17 is assembled into the frame 20 to thereby obtain the liquid crystal display module 11. Then, the stand 12 is attached to the liquid crystal display module 11 and the two exterior members 13 and 14 are assembled into the liquid crystal display module 11 so as to sandwich the liquid crystal display module 11 from the front and back sides. As a result, the liquid crystal display device 10 is complete.

The thus configured liquid crystal display device 10, in use, is placed in a posture that the display surface 15a stands along the vertical direction by the stand 12. Then, the liquid crystal display device 10 is powered on, the cold cathode tubes 22 of the backlight unit 16 are illuminated, and image signals are supplied to the liquid crystal panel 15. At that time, light emitted from the cold cathode tubes 22 passes directly or indirectly through the diffuser plate 19a and the optical sheets 19b of the optical member 19 as shown in FIGS. 3 and 4, so as to be converted into substantially sheet-like light, and then is radiated to the liquid crystal panel 15. Of the illumination light, indirect light indirectly radiated to the optical member 19 is mainly reflected by the reflection sheet 21 laid in the almost entire chassis 18. The reflection sheet 21 is a separate component from the heat insulator 27, and therefore may use a material with excellent light reflectivity. Specifically, if the heat insulator is omitted and the reflection sheet is configured to perform also the function of heat insulation, it is necessary to select a material with compatibility between heat insulation and light reflectivity for the reflection sheet. In many cases, such a material as described above is inferior in light reflectivity and is higher in cost as compared with a material specialized in light reflectivity. In this regard, according to the embodiment, the reflection sheet 21 is used as a separate component from the heat insulator 27 to allow selection of a material specialized in light reflectivity, whereby it is possible to achieve efficient reflection of light and improvement in brightness. In particular for achieving lower power consumption, some measures may be taken such as reducing a current value to be supplied to the cold cathode tubes 22 and decreasing the number of cold cathode tubes 22, but all of the measures tend to lower the brightness of illumination light. With this configuration, using the reflection sheet 22 with excellent light reflectivity as in the embodiment, makes it possible to effectively suppress lowering in brightness due to low power consumption.

Figure 8:
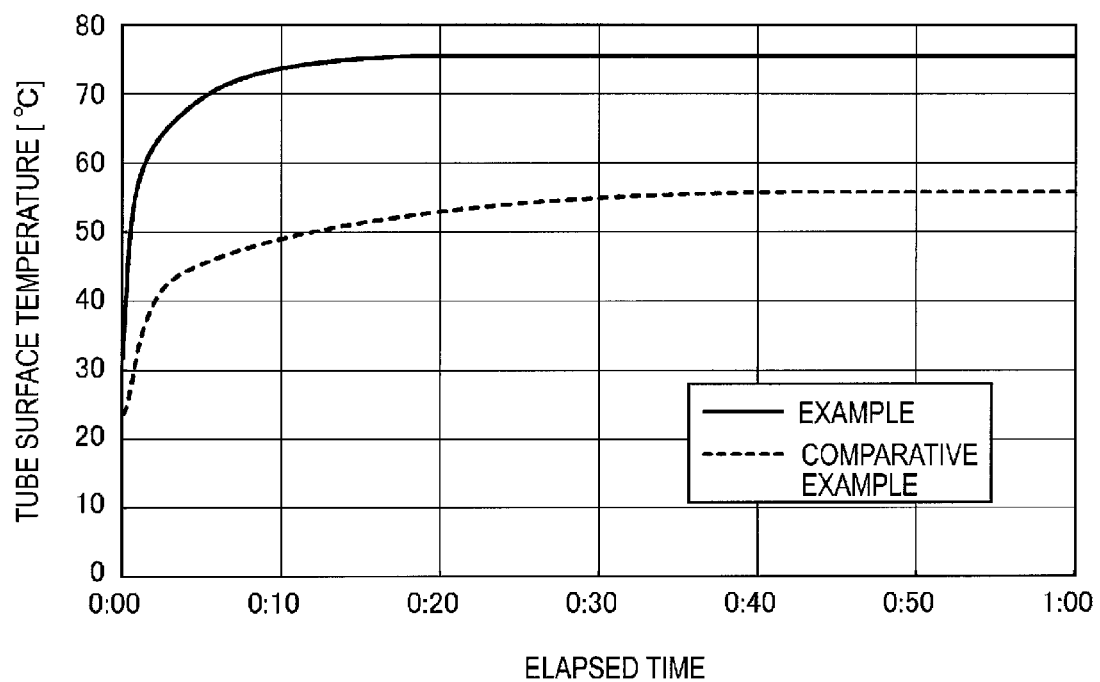
FIG. 8 is a graph showing changes in tube surface temperature with respect to time elapsed since start of illumination of cold cathode tubes.

The brightness of the cold cathode tubes 22 has a characteristic of depending on tube surface temperature. If the cold cathode tubes 22 start illumination under low-temperature environments at a temperature of 50° C. or less, the brightness of the cold cathode tubes 22 at the start of illumination is significantly lower than peak brightness, as shown in FIG. 7. Meanwhile, to achieve lower power consumption, an amount of heat generation of the cold cathode tubes 22 tends to be lowered. With this configuration, there is a tendency that, the more power consumption is lowered, much more time is required between the instant when the cold cathode tubes 22 start illumination under low-temperature environments at 50° C. or less and the instant when the cold cathode tubes 22 reach the optimum temperature (75° C.) at which peak brightness is obtained. In this regard, in the embodiment, the heat insulator 27 is disposed between the chassis 18 and the reflection sheet 21, which makes heat in the chassis 18 less prone to escape to the outside. Therefore, even if an amount of heat generation of the cold cathode tubes 22 becomes lower, the temperature in the chassis 18 can be efficiently raised by the generated heat, which makes it possible to shorten the time required to reach the optimum temperature at which peak brightness is obtained. In addition, the heat insulators 27 according to the embodiment are configured to extend over the almost entire bottom plate 18a, side plates 18b, and receiving plates 18c along the shorter side of the chassis 18, thereby to produce an extremely high heat insulating effect, which is useful especially in the case where the cold cathode tubes 22 start illumination under low-temperature environments. Specifically, with reference to a graph in FIG. 8, it will be described what variations exist in relation between time elapsed from start of illumination and tube surface temperature of the cold cathode tubes 22, in the case using the heat insulator 27 (an example shown by a solid line in FIG. 8) and the case without using the heat insulator 27 (a comparative example shown by a broken line in FIG. 8). As shown in FIG. 8, in the example using the heat insulator 27, the rate of increase in tube surface temperature since start of illumination is higher than that in the comparative example without using the heat insulator 27. Therefore, it can be said that the example can raise the tube surface temperature up to the optimum temperature (75° C.) in a relatively short time.

Meanwhile, the cold cathode tubes 22 continuously generate heat even when having reached the optimum temperature, and thus the tube surface temperature may further rise in excess of the optimum temperature. In that case, the brightness of the cold cathode tubes 22 becomes smaller than the peak brightness as shown in FIG. 7. With this configuration, in the embodiment, the second exterior member 14 surrounding the chassis 18 is provided with the heat release holes 14b as shown in FIG. 4, so that air inside and outside the exterior members 13 and 14 can be distributed through the heat release holes 14b, thereby achieving heat release from the chassis 18. The liquid crystal display device 10 is used in a position with the display surface 15a along the vertical direction as described above, and thus air inside the exterior members 13 and 14 flows toward the upper sides, thereby generating a so-called rising air current. Therefore, heat release performance may vary depending on how to distribute the heat release holes 14b in the exterior member 14 along the vertical direction, and when the opening areas of the heat release holes 14b are more increased on the upper side of the vertical direction, there is a tendency that outflow of air is facilitated and heat release performance is enhanced. In the embodiment, the opening areas of the heat release holes 14b are smaller at the upper portion 14A than the lower portion 14B of the second exterior member 14. With this configuration, outflow of air can be suppressed at the upper portion 14A from which air as a rising air current is prone to flow out through the heat release holes 14b, due to the small opening areas of the heat release holes 14b. This makes it possible to prevent excessive release of heat from the exterior members 13 and 14, and allow the heat insulators 27 to produce a heat insulation effect in an appropriate manner. In addition, the opening areas of the heat release holes 14b become smaller on the upper side of the upper portion 14A, which allows the heat release holes 14b to exert heat release performance in a more appropriate manner, and allows the heat insulators 27 to exert heat insulating performance in a more appropriate manner. With this configuration, it is possible to keep a balance between the amount of heat generation of the cold cathode tubes 22 having reached the optimum temperature and the amount of heat generation of the chassis 18, thereby maintaining the tube surface temperature of the cold cathode tubes 22 at the optimum temperature as much as possible.

As described above, the backlight unit 16 of the embodiment includes: the cold cathode tubes 22 as a light source; the chassis 18 housing the cold cathode tubes 22; the reflection sheet 21 disposed within the chassis 18 and reflecting light; and the heat insulator 27 disposed between the chassis 18 and the reflection sheet 21.

With this configuration, of light emitted from the cold cathode tubes 22, light headed toward the reflection sheet 21 can be effectively reflected and output by the reflection sheet 21. The cold cathode tubes 22 have temperature characteristics, that is, characteristics that brightness varies in accordance with the ambient temperature. Some of the cold cathode tubes 22 may have temperature characteristics that brightness varies proportional to the ambient temperature. When the cold cathode tubes 22 having such a configuration are used, time required to obtain the peak brightness after the cold cathode tubes 22 are turned on significantly depends on the ambient temperature, that is, mainly on an amount of heat generated by the cold cathode tubes 22 themselves.

Meanwhile, to attain lower power consumption at the backlight unit 16, some measures may be taken such as decreasing the number of cold cathode tubes 22 to be installed in the backlight unit 16, reducing an amount of current to be supplied to the cold cathode tubes 22, or the like, for example. However, if any of the foregoing measures is taken, an amount of heat generation of the cold cathode tubes 22 tends to decrease. With this configuration, there may arise a problem that lots of time is required between the instant when the cold cathode tubes 22 start illumination and the instant when the cold cathode tubes 22 obtain peak brightness.

In this regard, according to the invention, a heat insulator 27 is disposed between the chassis 18 and the reflection sheet 21, and therefore heat in the chassis 18 is unlikely to escape to the outside, which makes it possible to effectively raise a temperature in the chassis 18 due to heat generated by the cold cathode tubes 22. With this configuration, it is possible to shorten time needed to the instant when the cold cathode tubes 22 start illumination and the instant when the cold cathode tubes 22 reach an optimum temperature at which peak brightness is obtained. The invention is particularly useful in the case of starting illumination under low-temperature environments.

Further, in the present invention, the heat insulator 27 is used as a separate component from the reflection sheet 21, which makes it possible to select a material with excellent light reflectivity for the reflection sheet 21 and a material with excellent heat insulation performance for the heat insulator 27. That is, the degree of freedom becomes higher in selecting materials for the reflection sheet 21 and the heat insulator 27, thereby to provide the reflection sheet 21 with excellent light reflectivity and excellent thermal insulation performance. Especially, if there is a concern that illumination light at the backlight unit 16 becomes smaller in brightness due to reduced power consumption, using the reflection sheet 21 with high light reflectivity is excessively advantageous because it is possible to improve usage efficiency of light and suppress lowering in brightness of illumination light. In addition, the heat insulator 27 is disposed between the chassis 18 and the reflection sheet 21, and therefore it is possible to substantially avoid exposure of the heat insulator 27 on the cold cathode tube 22 side and prevent the heat insulator 27 from being recognized as a dark section. In addition, it is possible to substantially avoid the heat insulator 27 from being exposed outside of the chassis 18 and thus protect the heat insulator 27, and it is possible to press the heat insulator 27 with the reflection sheet 21. With this configuration, the invention is also preferred in mounting the heat insulator 27.

The chassis 18 has a bottom plate 18a disposed on a side opposite to a light output side with respect to the cold cathode tubes 22, and the reflection sheet 21 and the heat insulator 27 are disposed so as to extend over substantially the entire bottom plate 18a. With this configuration, disposing the heat insulator 27 so as to extend over the entire bottom plate 18a makes it possible to obtain a high heat insulating effect, which is preferably suited in particular for use under low-temperature environments.

The chassis 18 has side plates 18b rising from the bottom plate 18a toward the light output side, and the reflection sheet 21 and the heat insulator 27 each have a bottom portion 27a disposed along the bottom plate 18a; and rising portions 27b rising from the bottom portion 27a toward the light output side and disposed along the side plates 18b. With this configuration, the heat insulator 27 has the bottom portion 27a along the bottom plate 18a of the chassis 18 and the rising portions 27b along the side plates 18b, which makes it possible to obtain a still higher heat insulating effect.

The chassis 18 has receiving plates 18c jutting outward from distal ends of the side plates 18b, and the reflection sheet 21 and the heat insulator 27 each have extending portions 27c extending from rising ends of the rising portions 27b along the receiving plates 18c. With this configuration, the heat insulator 27 has the bottom portion 27a, the rising portions 27b, and the extending portions 27c along the receiving plates 18c, which makes it possible to obtain a still higher heat insulating effect.

There are provided lamp clips 23 as holding members configured to hold the reflection sheet 21 and the heat insulator 27 between the lamp clips 23 and the chassis 18. With this configuration, it is possible to hold the reflection sheet 21 and the heat insulator 27 collectively by the lamp clips 23, which is advantageous in installing the heat insulator 27.

The lamp clips 23 are provided with lamp holding portions 23b configured to hold the cold cathode tubes 22. With this configuration, the lamp clips 23 can also perform the function of holding the cold cathode tubes 22.

An optical member 19 is provided so as to face the light output side with respect to the cold cathode tubes 22, and the lamp clips 23 are provided with support portions 23c configured to support the optical member 19 from a side opposite to the light output side. With this configuration, the lamp clips 23 can also perform the function of supporting the optical member 19.

The heat insulator 27 is made of a foamed resin material. With this configuration, the costs of manufacturing the heat insulator 27 can be made less expensive.

The reflection sheet 21 has a surface of a white-based color. With this configuration, light reflectance can be high on the surface of the reflection sheet 21. Therefore, even if there is a concern that illumination light at the backlight unit 16 becomes smaller in brightness due to lower power consumption, it is possible to improve usage efficiency of light by using the reflection sheet 21 with high light reflectivity, thereby effectively suppressing reduction in rightness of illumination light.

The light source is the cold cathode tubes 22. With this configuration, since the cold cathode tube 22 contains mercury therein and has brightness with high temperature dependence, using the heat insulator 27 makes it possible to effectively shorten time required to reach an optimum temperature at which peak brightness is obtained.

The liquid crystal display device 10 according to the embodiment includes: the foregoing backlight unit 16; and the liquid crystal panel 15 providing display with the use of light from the backlight unit 16. According to the thus configured liquid crystal display device 10, the backlight unit 16 supplying light to the liquid crystal panel 15 makes it possible to shorten time required to obtain peak brightness, thereby realizing display with excellent quality.

The liquid crystal display device 10 includes the second exterior member 14 configured to house the backlight unit 16 and the liquid crystal panel 15 and having heat release holes 14b; and the stand 12 as a support member supporting the main plate surface of the chassis 18 along the vertical direction, in which the second exterior member 14 is divided into at least an upper portion 14A along the vertical direction and the lower portion 14B along the vertical direction, and opening areas of the heat release holes 14b are smaller at the upper portion 14A than the lower portion 14B. With this configuration, the liquid crystal display device 10 has the main plate surface of the chassis 18 disposed along the vertical direction, thereby generating an upward air current due to temperature rise. According to the invention, the opening areas of the heat release holes 18b are smaller at the upper portion 14A of the second exterior member 14 than the lower portion 14B of the same along the vertical direction, which makes it possible to suppress outflow of air from the heat release holes 18b at the upper portion 14A and suppress excessive heat release from the second exterior member 14. With this configuration, it is possible to avoid deterioration of heat insulating effect of the heat insulator 27 due to excessive heat release.

The opening areas of the heat release holes 14b become smaller toward the upper side of the vertical direction. This achieves more appropriate heat release performance of the heat release holes 14b, which allows the heat insulator 27 to exert heat insulating performance in a more appropriate manner.

The second exterior member 14 is provided with the plurality of heat release holes 14b with substantially the same shape, and the number of the heat release holes 14b decreases toward the upper side of the vertical direction. With this configuration, changing the number of heat release holes 14b with substantially the same shape makes it possible to control the opening area of the second exterior member 14, which is advantageous in manufacturing the second exterior member 14.

<Second Embodiment>

A second embodiment of the invention will be described with reference to FIG. 9 or 10. In the second embodiment, a heat insulator 127 is modified in shape. The same structures, operations and advantages as those in the first embodiment are not described here.

Figure 9:
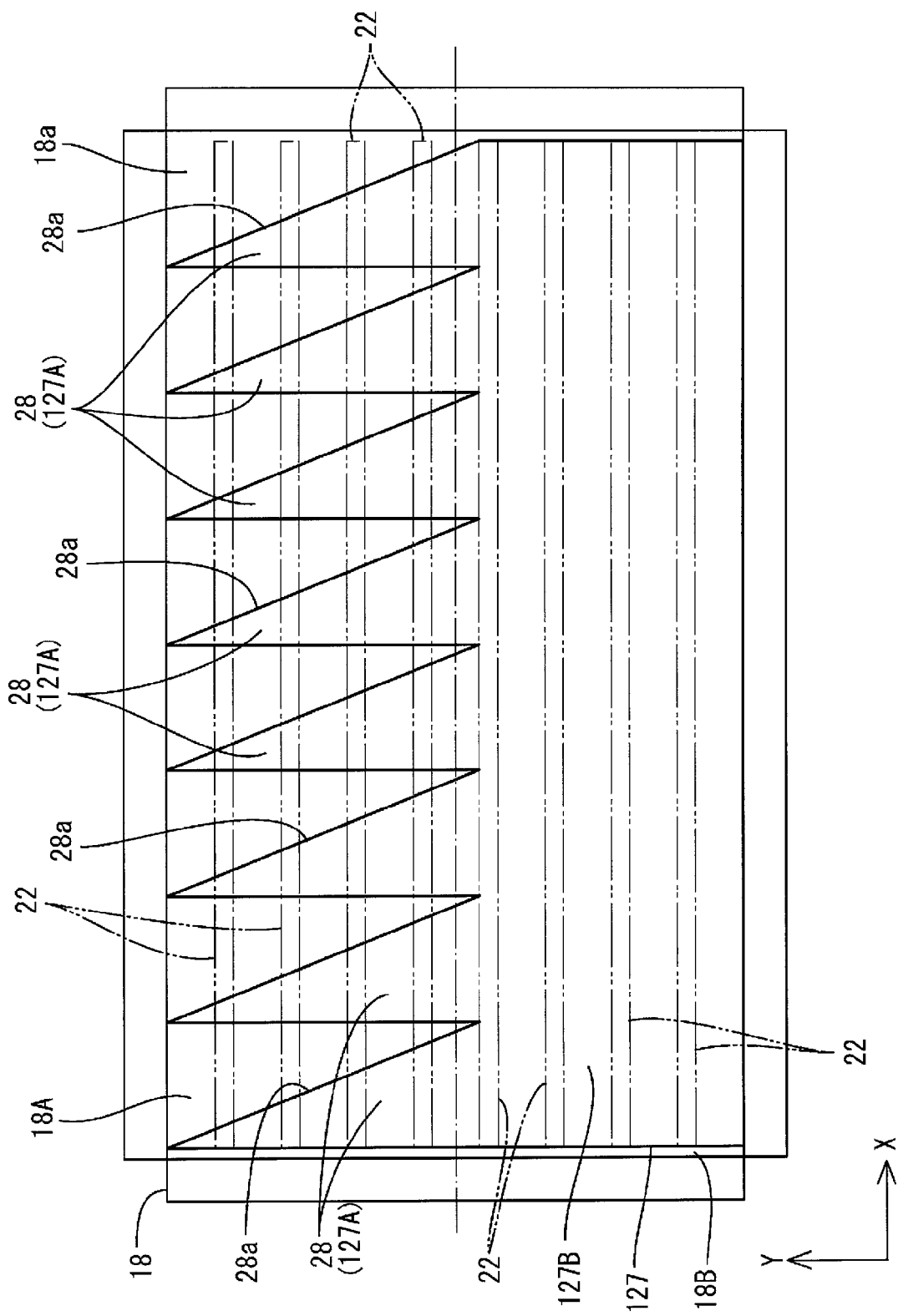
FIG. 9 is a plan view showing a layout of heat insulators in a chassis according to a second embodiment of the invention.
Figure 10:
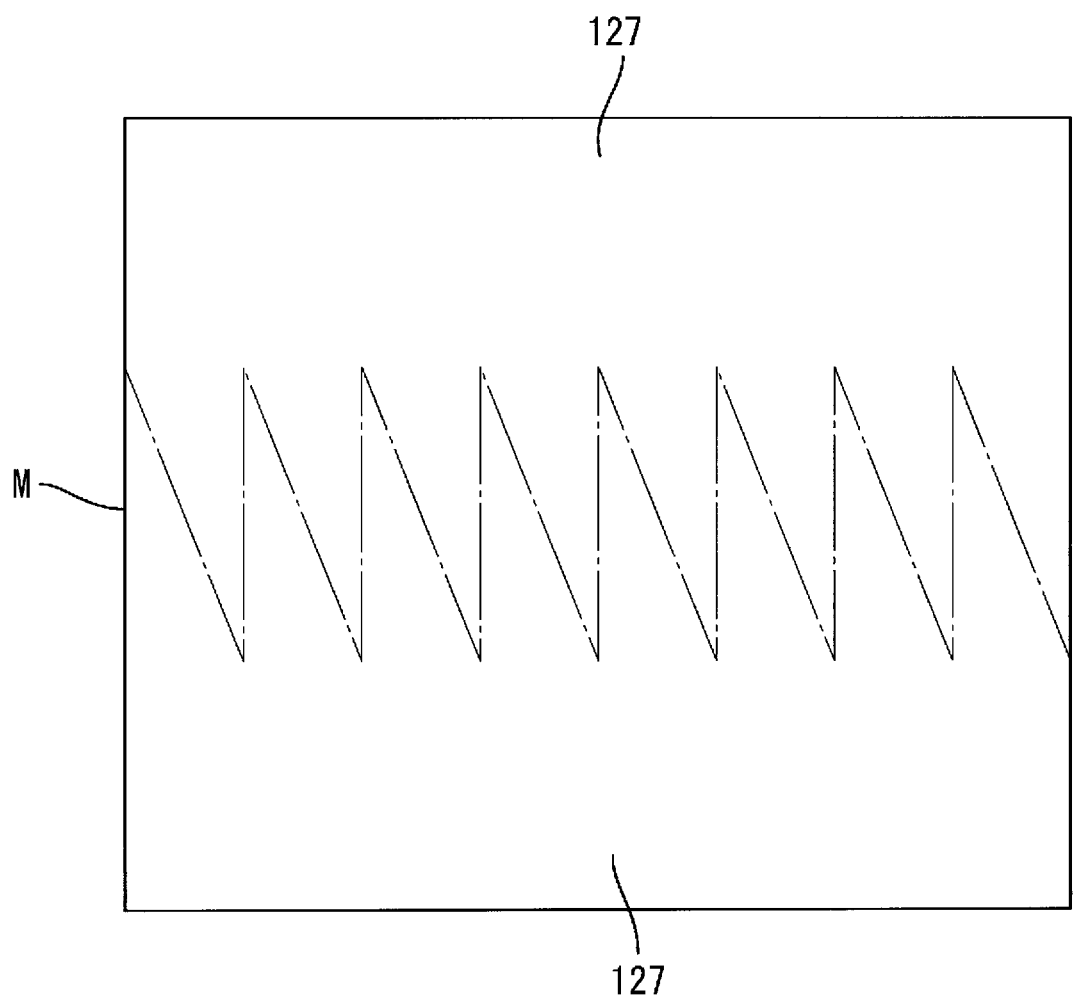
FIG. 10 is a plan view showing a method of manufacturing two heat insulators by dividing a base material.

Assuming that the chassis 18 is divided into an upper portion 18A and a lower portion 18B with a center (shown by an alternate long and short dash like in FIG. 9) as a boundary therebetween; and a part of the heat insulator 127 overlapping the upper portion 18A is designated as an upper portion overlapping area 127A; and a part of the heat insulator 127 overlapping the lower portion 18B as a lower portion overlapping area 127B, the upper portion overlapping area 127A is smaller in area than the lower portion overlapping area 127B, as shown in FIG. 9. Specifically, the lower portion overlapping area 127B is sized so as to extend over the almost entire bottom plate 18a at the lower portion 18B of the chassis 18, whereas the upper portion overlapping area 127A is sized so as to cover about a half of (partially) the bottom plate 18a at the upper portion 18A of the chassis 18. The upper portion overlapping area 127A is formed by a plurality of inclined parts 28 having sides inclined with respect to the Y-axis direction (vertical direction). The inclined parts 28 have an approximately right-angled triangular shape in a plan view, and have adjacent sides aligned with the X-axis direction and the Y-axis direction. The eight inclined parts 28 are disposed in parallel along the X-axis direction (horizontal direction perpendicular to the vertical direction). The inclined parts 28 are identical in outer shape and area, and thus the alignment pitches between the adjacent inclined parts are almost equal. The inclined parts 28 each have an inclined side 28a disposed on the right shown in FIG. 9. Therefore, the area of the upper portion overlapping area 127A including the thus shaped inclined parts 28, that is, the area of covering the bottom plate 18a of the chassis 18, becomes continuously and gradually smaller toward the upper side. The inclined parts 28 each have the inclined side 28a disposed so as to crossover the cold cathode tubes 22. Therefore, the upper portion overlapping area 127A changes in area continuously and gradually along the vertical direction, regardless of the parts overlapping the cold cathode tubes 22 or the parts not overlapping the cold cathode tubes 22. In addition, of the cold cathode tubes 22 disposed at the upper portion 18A, the cold cathode tubes 22 positioned on the upper side of the vertical direction have relatively smaller areas overlapping the upper portion overlapping area 127A than the cold cathode tubes 22 positioned on the lower side of the vertical direction. The heat insulator 127 has a rotational symmetric shape with twofold symmetry.

The foregoing configuration makes it possible to obtain operations and effects as described below. Specifically, when the cold cathode tubes 22 are illuminated in a posture that the liquid crystal display device 10 is positioned with the display surface 15a standing along the vertical direction, the temperature in the chassis 18 tends to be higher at the upper portion 18A than the lower portion 18B along the vertical direction due to air convection. To cope with that, in the embodiment, the heat insulator 127 is smaller in area at the upper portion overlapping area 127A than the lower portion overlapping area 127B, and is lower in heat insulating performance on the upper portion 18A side. That is, the heat insulating performance of the heat insulator 127 is inversely proportional to temperature distribution that may be generated in the chassis 18, which makes it possible to suppress excessive temperature rise at the upper portion 18A. With this configuration, it is possible to prevent that the tube surface temperature at the cold cathode tubes 22 disposed in particular at the upper portion 18A exceeds the optimum temperature at which the peak brightness is obtained, thereby suppressing lowering in brightness. In addition, the upper portion overlapping area 127A becomes continuously and gradually smaller in area toward the upper side, and therefore the upper portion overlapping area 127A can exert heat releasing performance more adapted to temperature distribution in the chassis 18. This allows the heat insulator 127 to exert heat insulating performance in an appropriate manner regardless of the position thereof along the vertical direction. Further, the upper portion overlapping area 127A is configured to have the plurality of inclined parts 28 disposed in parallel along the X-axis direction, whereby the heat insulator 127 can be disposed almost evenly along the X-axis direction, and unevenness is less prone to occur in distribution and heat insulating performance of the heat insulators 127 along the X-axis direction. In addition, the heat insulator 127 has a rotational symmetric shape with twofold symmetry. Therefore, as shown in FIG. 10, if the heat insulator 127 is manufactured by dividing one base material M into two along an alternate long and short dash line in FIG. 10, the intricately-shaped heat insulators 127 is obtained from the simple square shaped base material M, which achieves a favorable yield of the material and realize low-cost manufacturing.

According to the embodiment as described above, the chassis 18 has a main plate surface disposed along a vertical direction, and the chassis 18 is divided into at least an upper portion 18A along the vertical direction and a lower portion 18B along the vertical direction, and, in the heat insulator 127, the area of an upper portion overlapping area 127A overlapping the upper portion 18A is smaller than the area of a lower portion 127B superimposed portion overlapping the lower portion 18B. With this configuration, the backlight unit 16 has the main plate surface of the chassis 18 disposed along the vertical direction, and thus air in the chassis 18 flows by convection on upper and lower sides of the vertical direction, and as a result, a temperature in the chassis 18 tends to be higher at the upper portion 18A than the lower portion 18B along the vertical direction. According to the embodiment, in the heat insulator 127, the area of the upper portion overlapping area 127A overlapping the upper portion 18A of the chassis 18 is smaller than the area of the lower portion overlapping area 127B overlapping the lower portion 18B of the chassis 18, whereby it is possible to suppress an excessively high temperature at the upper portion 18A. Here, the cold cathode tubes 22 may tend to be lower in brightness if the cold cathode tubes 22 exceed the optimum temperature at which peak brightness is obtained. Therefore, suppressing an excessively high temperature at the upper portion 18A of the chassis 18 as described above makes it possible to keep the brightness of the cold cathode tubes 22 disposed on the upper portion 18A side in an appropriate state. In addition, it is possible to reduce a material cost for the heat insulator 127, as compared to the case where the heat insulator is disposed over the entire chassis 18.

The heat insulator 127 becomes smaller in area toward the upper side of the vertical direction. With this configuration, the area of the heat insulator 127 is smaller on the upper portion 18A side of the chassis 18 with higher temperature, and the area of the heat insulator 127 is larger on the lower portion 18B side of the chassis 18 with lower temperature. That is, the area of the heat insulator 127 is adapted to temperature distribution in the chassis 18, whereby it is possible to keep the brightness of the cold cathode tubes 22 in a more appropriate state, regardless orientation of the vertical direction of the chassis 18.

The upper portion overlapping area 127A is formed so as to be smaller in area continuously and gradually toward the upper side of the vertical direction. With this configuration, the area of the upper portion overlapping area 127A can be adapted to temperature distribution in the chassis 18, which makes it possible to keep the brightness of the cold cathode tubes 22 in a further appropriate state.

The upper portion overlapping area 127A includes a plurality of inclined parts 28 having a side inclined (inclined sides 28a) with respect to the vertical direction, and the inclined parts 28 are arranged in parallel in a direction intersecting with the vertical direction. With this configuration, the plurality of inclined parts 28 constituting the upper portion overlapping area 127A is dispersed in the chassis 18 in the direction intersecting with the vertical direction, whereby it is possible to avoid unevenness in distribution of the heat insulator 127 in the direction intersecting with the vertical direction.

Space between the adjacent inclined parts 28 is almost equal. With this configuration, the inclined parts 28 are almost evenly disposed in the direction intersecting with the vertical direction, which makes it further less prone to generate unevenness in distribution of the heat insulator 127.

Although the second embodiment of the invention is as described above, the invention is not limited to the foregoing embodiment, and may include modification examples as described below. In the following modification examples, some of the same members as those in the foregoing embodiment are given the same reference numerals as those in the foregoing embodiment, and thus are not shown or described below.

<First Modification of the Second Embodiment>

A first modification of the second embodiment will be described with reference to FIG. 11. In the first modification example of the second embodiment, a heat insulator 127-1 is modified in shape.

Figure 11:
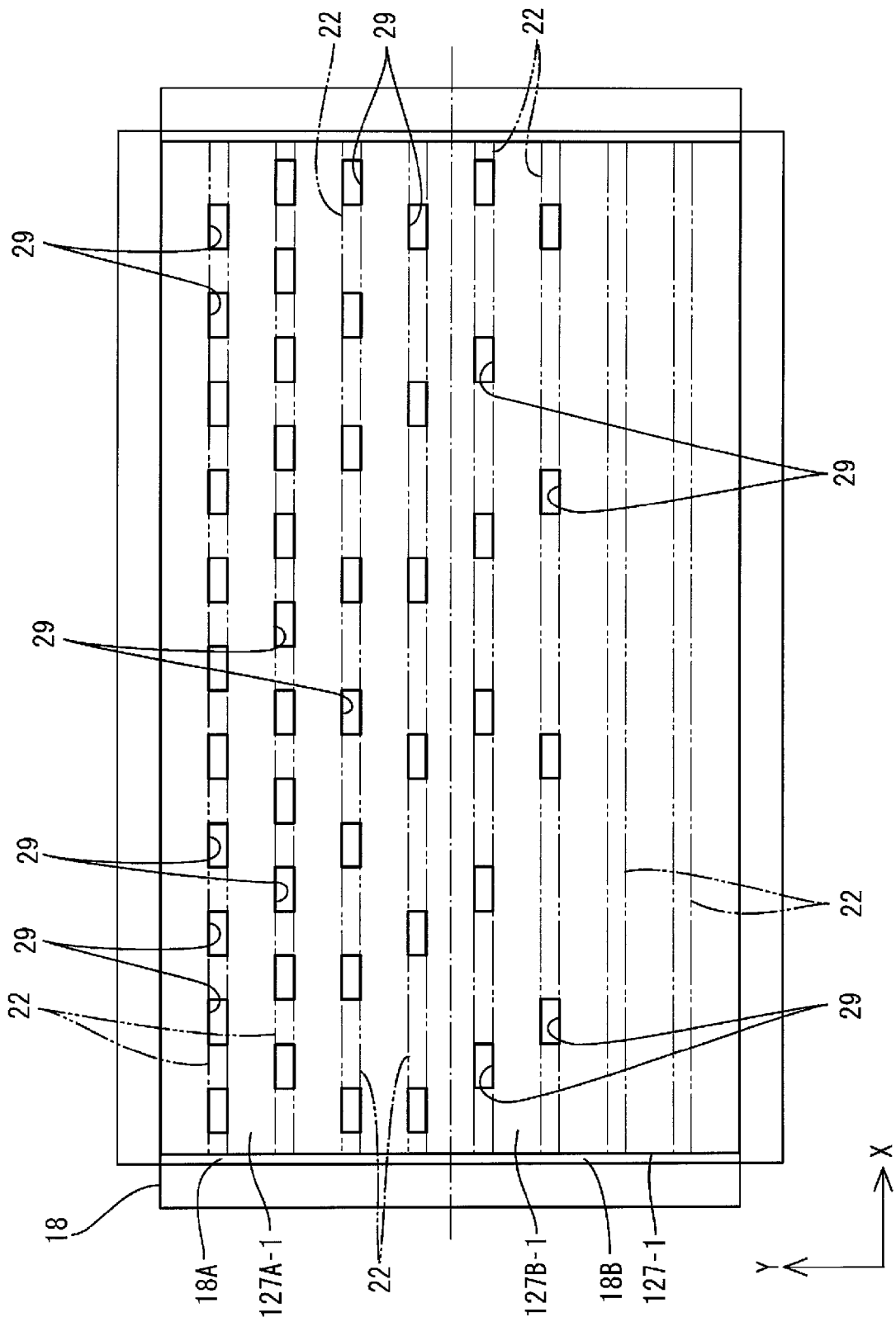
FIG. 11 is a plan view showing a layout of heat insulators in a chassis according to a first modification example of the second embodiment.

The heat insulator 127-1 according to the embodiment is formed so as to be sequentially smaller in area in a stepwise manner toward the upper side of the vertical direction (Y-axis direction), as shown in FIG. 11. Specifically, the heat insulator 127-1 has through holes 29through holes 29 penetrating therethrough and becoming sequentially larger in opening area stepwise toward the upper side along the vertical direction. More specifically, the heat insulator 127-1 has a plurality of through holes 29through holes 29 identical in outer shape and area, and the number of the openings becomes larger toward the upper side of the vertical direction. The through holes 29through holes 29 each have a rectangular shape in a plan view, and are disposed with a longer side aligned with the X-axis direction and a shorter side aligned with the Y-axis direction. The through holes 29through holes 29 are overlapping the cold cathode tubes 22 in a plan view, and the shorter side dimension thereof is substantially the same as the outer diameter dimension of the cold cathode tubes 22. Specifically, the through holes 29through holes 29 are disposed in plurality in parallel along the axial direction of each of the cold cathode tubes 22. In a column of the through holes 29through holes 29 on each of the cold cathode tubes 22, the alignment pitches between the adjacent through holes 29through holes 29 along the X-axis direction as direction of parallel alignment, are almost identical. In addition, the number of through holes 29through holes 29 is larger at the upper portion overlapping area 127A-1 than the lower portion overlapping area 127B-1 of the heat insulator 127-1. Specifically, the through holes 29through holes 29 are not formed in the lower half of the lower portion overlapping area 127B-1 of the heat insulator 127-1, but are formed in the upper half of the same. Of the through holes 29through holes 29 in the upper half, the number of the through holes 29through holes 29 corresponding to the upper cold cathode tubes 22 is larger than the number of through holes 29through holes 29 corresponding to the lower cold cathode tubes 22. Meanwhile, the through holes 29through holes 29 are formed according to all of the cold cathode tubes 22 at the upper portion overlapping area 127A-1 of the heat insulator 127-1. The number of the through holes 29through holes 29 corresponding to the cold cathode tubes 22 at the upper portion overlapping area 127A-1 is larger than the number of through holes 29through holes 29 corresponding to the cold cathode tubes 22 at the lower portion overlapping area 127B-1. At the upper portion overlapping area 127A-1, the number of the through holes 29through holes 29 corresponding to the upper cold cathode tubes 22 is larger than the number of the through holes 29through holes 29 corresponding to the lower cold cathode tubes 22.

The foregoing configuration makes it possible to obtain operations and advantages described below. Specifically, in the embodiment, the heat insulator 127-1 becomes sequentially smaller in area stepwise toward the upper side of the vertical direction, and becomes lower in heat insulating performance stepwise on the upper side. That is, the heat insulating performance of the heat insulator 127-1 is lowered stepwise with respect to temperature distribution that may be generated in the chassis 18, which makes it possible to suppress excessive temperature rise at the upper portion 18A of the chassis 18. With this configuration, it is possible to prevent that tube surface temperature on the cold cathode tubes 22 particularly disposed at the upper portion 18A exceeds the optimum temperature at which the peak brightness is obtained, thereby suppressing lowering in brightness. In addition, the upper portion overlapping area 127A-1 is configured to have the plurality of through holes 29through holes 29 disposed in parallel along the X-axis direction, whereby the heat insulator 127-1 can be disposed substantially evenly along the X-axis direction, and unevenness is less prone to occur in distribution and heat insulating performance of the heat insulators 127-1 along the X-axis direction. Further, the through holes 29through holes 29 overlap the cold cathode tubes 22, whereby it is possible to facilitate heat release from the surroundings of the cold cathode tubes 22 and thus effectively prevent that tube surface temperature on the cold cathode tubes 22 exceeds the optimum temperature.

According to the modification example as described above, the upper portion overlapping area 127A-1 is formed so as to be gradually smaller in area stepwise toward the upper side of the vertical direction. With this configuration, the area of the upper portion overlapping area 127A-1 can be adapted to the temperature distribution in the chassis 18, which makes it possible to keep the brightness of the cold cathode tubes 22 in a more appropriate state.

The upper portion overlapping area 127A-1 has the through holes 29 penetrating therethrough and becoming gradually larger in opening area stepwise toward the upper side of the vertical direction. With this configuration, at the through holes 29, heat in the chassis 18 is more likely to be discharged outside, as compared to the parts with the heat insulator 127-1. Changing the opening areas of the through holes 29 sequentially stepwise makes it possible to keep the brightness of the cold cathode tubes 22 in a more appropriate state.

The upper portion overlapping area 127A-1 has the plurality of through holes 29 substantially identical in shape, and the number of through holes 29 increases toward the upper side of the vertical direction. With this configuration, changing the number of the through holes 29 substantially identical in shape makes it possible to control the opening area in the upper portion overlapping area 127A-1, which is advantageous in manufacturing the heat insulator 127-1.

The holes 29 are arranged so as to overlap the cold cathode tubes 22. With this configuration, the heat is released through the holes 29 arranged so as to overlap. Therefore, the ambient temperature around the cold cathode tubes 22 is less likely to exceed the optimum temperature and thus the brightness of the cold cathode tubes 22 is maintained at further proper level.

The through holes 29 are disposed in plurality in parallel with the direction intersecting with the vertical direction. With this configuration, the through holes 29 are dispersed along the direction intersecting with the vertical direction in the chassis 18, which makes it possible to avoid generation of unevenness in distribution of the heat insulator 127-1 along the direction intersecting with the vertical direction.

<Second Modification of the Second Embodiment>

A second modification example of the second embodiment will be described with reference to FIG. 12 or 13. In the second modification example, a heat insulator 127-2 is further modified in shape.

Figure 12:
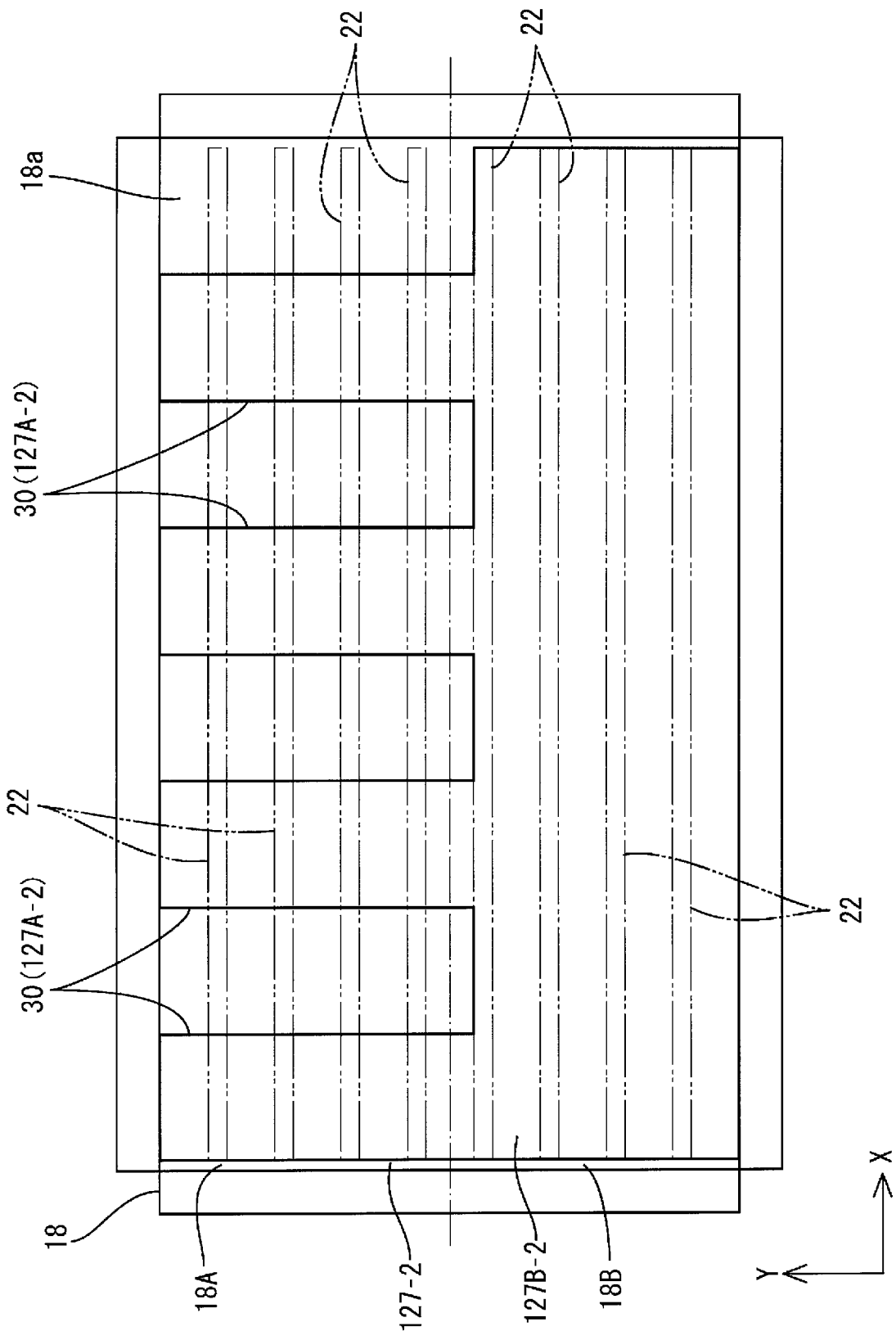
FIG. 12 is a plan view showing a layout of heat insulators in a chassis according to a second modification example of the second embodiment.
Figure 13:
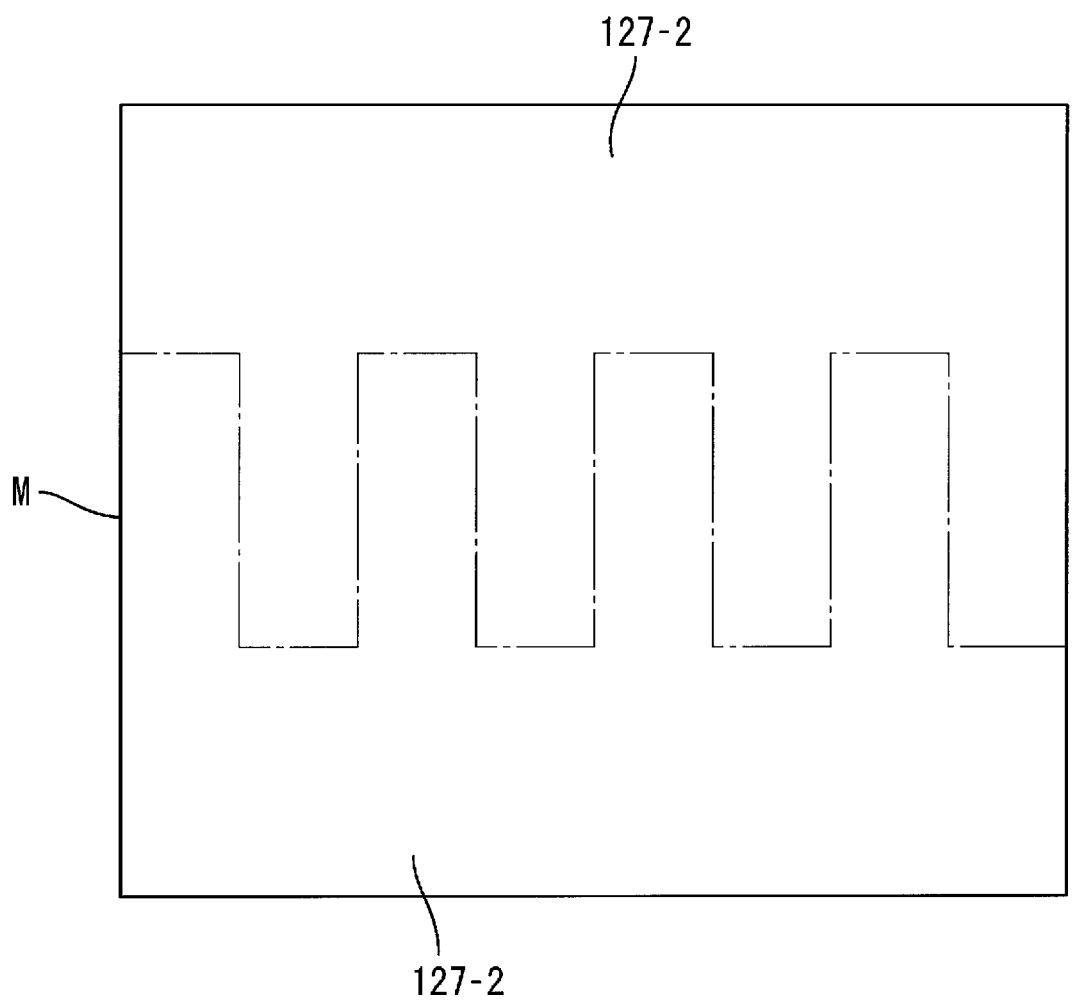
FIG. 13 is a plan view showing a method for manufacturing two heat insulators by dividing a base material.

In the heat insulator 127-2 according to the modification example, an upper portion overlapping area 127A-2 is formed by constant width parts 30 substantially constant in width along the X-axis direction, as shown in FIG. 12. Specifically, the constant width parts 30 each have an approximately rectangular shape in a plan view and have a longer side aligned with Y-axis direction and a shorter side aligned with the X-axis direction. Shorter side dimension and longer side dimension of the constant width parts 30 are each made constant. The constant width parts 30 are disposed in parallel at four positions along the X-axis direction (horizontal direction perpendicular to the vertical direction). The constant width parts 30 are identical in outer shape and area, and therefore the alignment pitches between the adjacent constant width parts 30 are almost equal. The constant width parts 30 crossover the cold cathode tubes 22 disposed at the upper portion 18A, and the areas of parts of the constant width parts 30 overlapping the cold cathode tubes 22 are almost equal. With this configuration, the upper portion overlapping area 127A-2 is relatively small in area than the lower portion overlapping area 127B-2, and the upper portion overlapping area 127A-2 is sized so as to cover about a half of (partially) the bottom plate 18a at the upper portion 18A of the chassis 18. The heat insulator 127-2 has an approximately comb-like form as a whole, and is formed in a rotational symmetric shape with twofold symmetry.

The foregoing configuration makes it possible to obtain operations and advantages described below. Specifically, the heat insulator 127-2 according to the embodiment is smaller in area at the upper portion overlapping area 127A-2 than the lower portion overlapping area 127B-2, and the heat insulator 127-2 becomes lower in heat insulating performance on the upper portion 18A side, which makes it possible to suppress excessive temperature rise at the upper portion 18A. With this configuration, it is possible to prevent that tube surface temperature on the cold cathode tubes 22 particularly disposed at the upper portion 18A exceeds the optimum temperature at which the peak brightness is obtained, thereby suppressing lowering in brightness. In addition, the upper portion overlapping area 127A-2 is configured to have the plurality of constant width parts 30 disposed in parallel along the X-axis direction, whereby the heat insulator 127-2 can be substantially evenly disposed along the X-axis direction, and unevenness is less prone to occur in distribution and heat insulating performance of the heat insulator 127. In addition, the heat insulator 127-2 has a rotational symmetric shape with twofold symmetry. Therefore, as shown in FIG. 13, if the heat insulator 127-2 is manufactured by dividing one base material M into two along an alternate long and short dash line in FIG. 13, the intricately-shaped heat insulators 127-2 can be obtained from the simple square shaped base material M, which achieves a favorable yield of the material and realize low-cost manufacturing.

According to the modification example as described above, the upper portion imposed portion 127A-2 has the constant width parts 30 substantially constant in width along the direction perpendicular to the vertical direction, and the constant width parts 30 are disposed in plurality in parallel along the direction intersecting with the vertical direction. With this configuration, the constant width parts 30 constituting the upper portion overlapping area 127A-2 are dispersed in the chassis 18 along the direction intersecting with the vertical direction, which makes it possible to avoid occurrence of unevenness in distribution of the heat insulator 127-2 along the direction intersecting with the vertical direction.

Space between the adjacent constant width parts 30 is almost equal. With this configuration, the constant width parts 30 are substantially evenly disposed along the direction intersecting with the vertical direction, which makes it further less prone to generate unevenness in distribution of the heat insulator 127-2.

<Third Embodiment>

A third embodiment of the present invention will be described with reference to FIG. 14 or 15. In the third embodiment, heat insulators 227 are modified in shape. Redundant description of structures, operation, or effects similar to those according to the first embodiment will be omitted.

Figure 14:
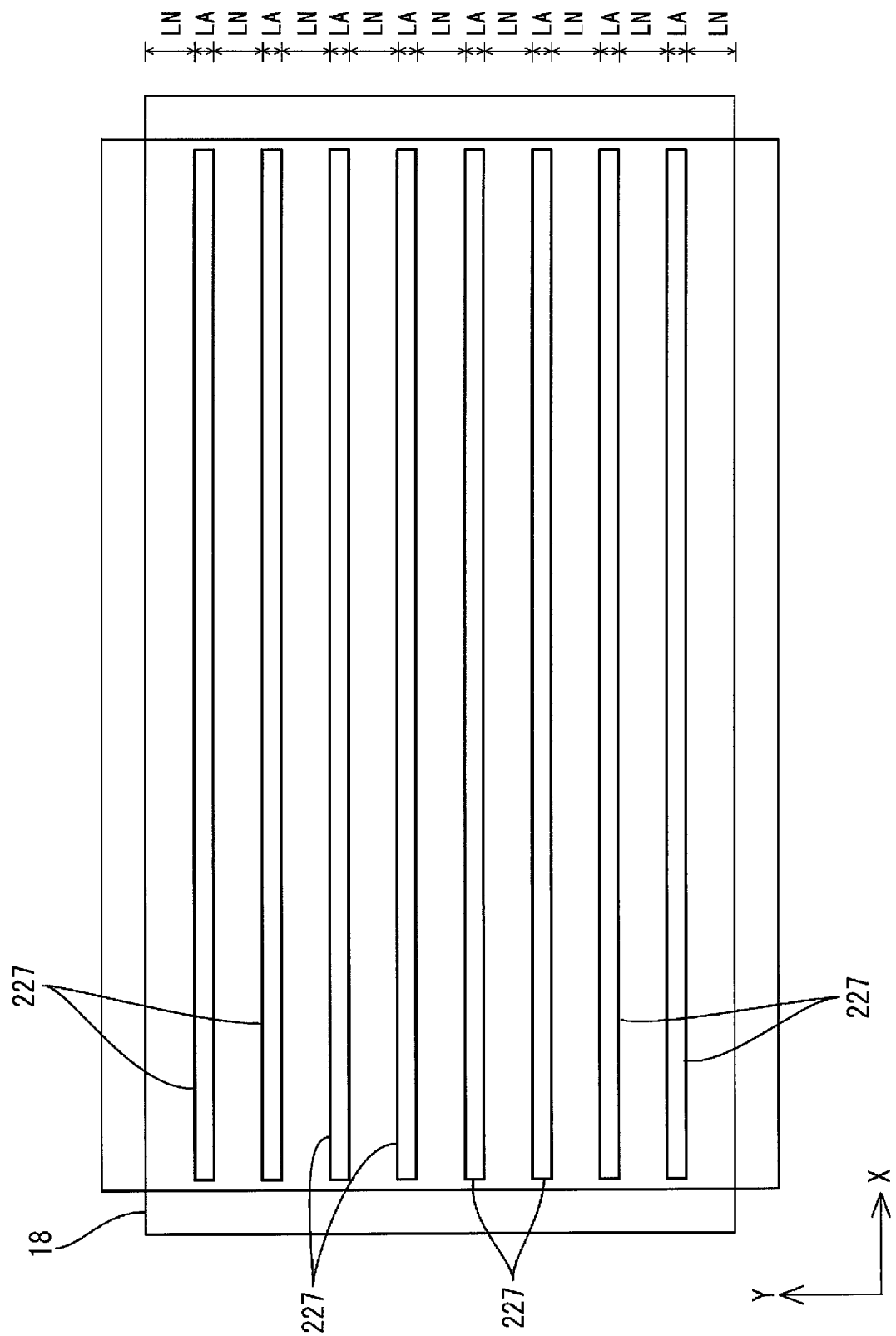
FIG. 14 is a plan view showing a layout of heat insulators in a chassis according to a third embodiment of the invention.
Figure 15:
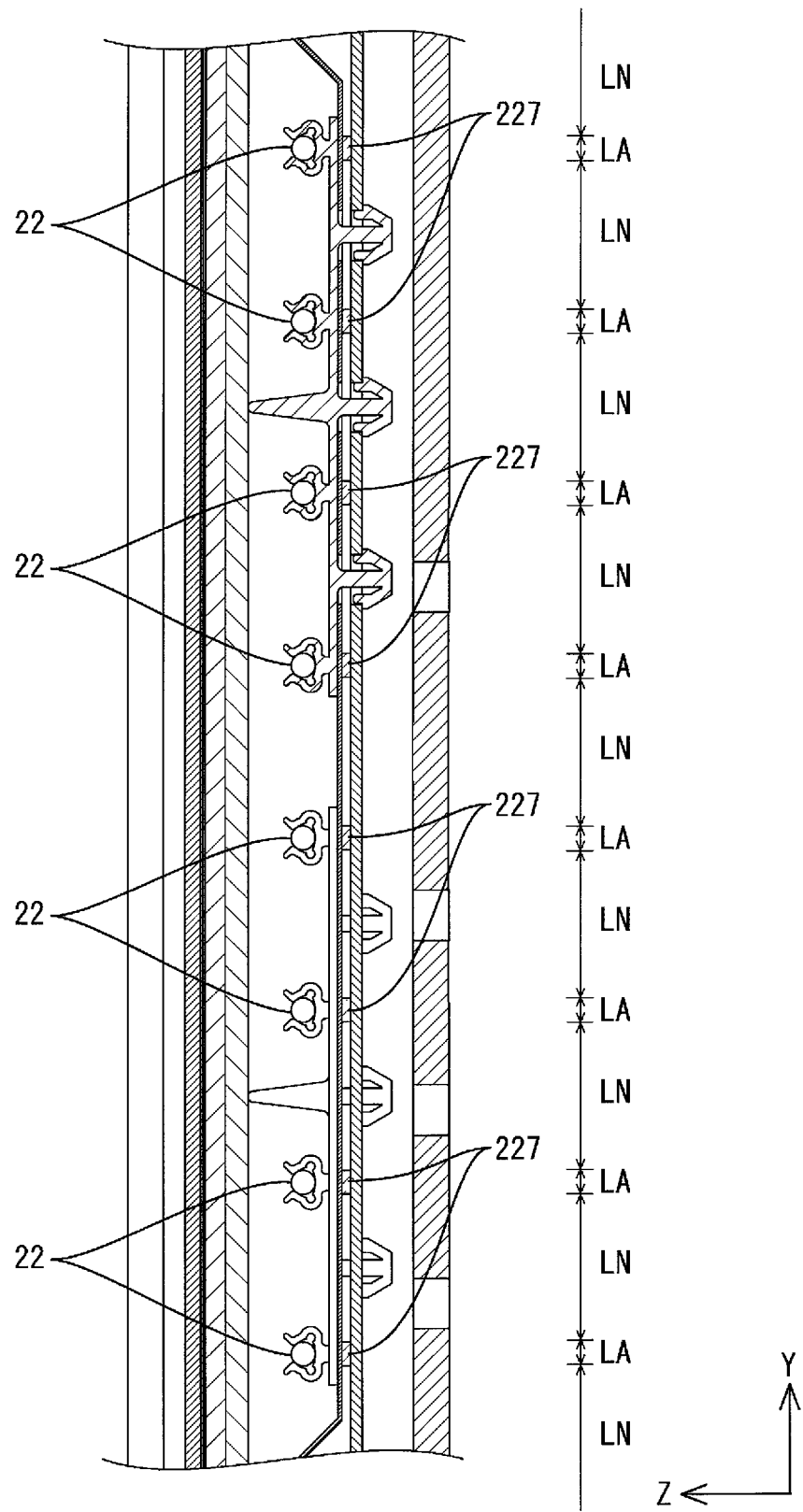
FIG. 15 is a cross section view of the liquid crystal display device along a shorter side.

As shown in FIGS. 14 and 15, the heat insulators 227 according to the embodiment are selectively disposed at positions overlapping the cold cathode tubes 22 in a plan view. Specifically, the heat insulators 227 are provided in plurality corresponding to the cold cathode tubes 22 disposed in the chassis 18, and the size of the heat insulators 227 is almost equal to that of the cold cathode tubes 22 in a plan view. That is, the heat insulators 227 have a planar shape following the planar shape of the cold cathode tubes 22, and are selectively disposed only in the light source superimposed region LA overlapping the cold cathode tubes 22 in the chassis 18 and are not disposed in the light source non-superimposed regions LN not overlapping the cold cathode tubes 22. Disposing the heat insulators 227 in a manner as described above efficiently insulates the surroundings of the cold cathode tubes 22 from heat, whereby it is possible to shorten time required between the instant when the cold cathode tubes 22 start illumination and the instant when the cold cathode tubes 22 reach the optimum temperature. In addition, the total area of the heat insulators 227 is smallest as compared to those in the first and second embodiments, thereby allowing largest reduction in material costs.

According to the embodiment as described above, the heat insulators 227 are selectively disposed at positions overlapping the cold cathode tubes 22. With this configuration, disposing the heat insulators 227 at positions overlapping the cold cathode tubes 22 makes it possible to efficiently raise the temperature of the surroundings of the cold cathode tubes 22. In addition, disposing selectively the heat insulators 227 makes it possible to reduce material costs for the heat insulators 227.

<Other Embodiments>

The present invention is not limited to any of the foregoing embodiments described above with reference to the drawings. The technical scope of the present invention may include the following embodiments.

(1) In the foregoing first embodiment, the heat insulator has a shape following the reflection sheet. Alternatively, the extending portions may be omitted from the heat insulator according to the first embodiment, for example. Similarly, the rising portions may be omitted from the heat insulator. In addition, the bottom portion of the heat insulator may be made smaller in size than the bottom plate of the chassis (bottom portion of the reflection sheet) in a plan view.

(2) In the foregoing second embodiment, the inclined parts are formed in a right-angled triangular shape. Alternatively, the inclined parts may be formed in an isosceles triangular shape or an equilateral triangular shape, for example. Further, the inclined parts may have a triangular shape in which sides are different from each other in length. Besides triangular shapes, the inclined parts maybe formed in a polygonal shape with oblique sides (a lozenge, a parallelogram, a pentagon, or the like, for example).

(3) In the foregoing second embodiment, a plurality of inclined parts is aligned with equal pitches. However, the invention also includes an arrangement in which a plurality of inclined parts is aligned with unequal pitches and an arrangement in which only one inclined part is provided, for example.

(4) In the foregoing second embodiment, a plurality of inclined parts with the same shape is disposed. However, the invention also includes an arrangement in which two or more kinds of inclined parts with different shapes are disposed.

(5) In the foregoing second embodiment, the heat insulator is configured to become continuously and gradually smaller in area toward the upper side. However, the invention also includes an arrangement in which the upper portion overlapping area is stepped in a plan view and becomes sequentially smaller in area stepwise toward the upper side, for example.

(6) In the foregoing first modification example of the second embodiment, the openings are formed in a rectangular shape, but the shape of the openings can be modified as appropriate. For example, the invention also includes an arrangement in which the openings are formed in a square, triangular, pentagonal, lozenged, parallelogram shape, or the like.

(7) In the foregoing first modification example of the second embodiment, a plurality of openings is aligned with equal pitches. However, the invention also includes an arrangement in which a plurality of openings is aligned with unequal pitches and an arrangement in which one opening is provided for each of the cold cathode tubes, for example.

(8) In the foregoing first modification example of the second embodiment, a plurality of openings with the same shape is aligned. However, the invention also includes an arrangement in which two or more kinds of openings with different shapes (opening areas) are disposed.

(9) In the foregoing first modification example of the second embodiment, the openings are disposed at positions overlapping the cold cathode tubes. However, the invention also includes an arrangement in which the openings are disposed at positions not overlapping the cold cathode tubes.

(10) In the foregoing first modification example of the second embodiment, the shorter side dimension of the openings is substantially the same as the outer diameter dimension of the cold cathode tubes. However, the invention also includes an arrangement in which the shorter side dimension of the openings is smaller or larger than the outer diameter dimension of the cold cathode tubes.

(11) In the foregoing second modification example of the second embodiment, a plurality of constant width parts is aligned with equal pitches. However, the invention also includes an arrangement in which a plurality of constant width parts is aligned with unequal pitches, for example.

(12) In the foregoing second modification example of the second embodiment, a plurality of constant width parts with the same shape is disposed. However, the invention also includes an arrangement in which two or more kinds of constant width parts with different shapes are disposed.

(13) In the foregoing third embodiment, the heat insulators are disposed only at positions overlapping the cold cathode tubes. However, the invention also includes an arrangement in which the heat insulators are disposed only at positions not overlapping the cold cathode tubes.

(14) In the foregoing third embodiment, the heat insulator is almost equal in size to the cold cathode tubes in a plan view. However, the invention also includes an arrangement in which the heat insulators are smaller or larger in size than the cold cathode tubes in a plan view.

(15) In the foregoing embodiments, the second exterior member has the heat release holes formed in a horizontally long oval shape. However, the shape of the heat release holes can be changed as appropriate.

(16) In the foregoing embodiments, the second exterior member has the heat release holes of the same shape. However, the invention also includes an arrangement in which two or more kinds of heat release holes with different shapes (opening areas) are disposed.

(17) In the foregoing embodiments, the second exterior member has the heat release holes aligned with equal pitches along the X-axis direction. However, the invention also includes an arrangement in which a plurality of heat release holes is aligned with unequal pitches along the X-axis direction, for example.

(18) In the foregoing embodiments, the lamp clips have support portions, but the support portions may be omitted. In addition, the lamp holding portions may be omitted from the lamp clips, such that the lamp clips serve also as holding members holding the reflection sheet and the heat insulator between the holding members and the chassis.

(19) In the foregoing embodiments, the heat insulator(s) are made of a foamed resin material. However, the invention also includes an arrangement in which the heat insulator(s) are made of a fiber-based resin material.

(20) In the foregoing embodiments, the reflection sheet has a surface of a white color. However, the invention also includes an arrangement in which the reflection sheet has a surface of a color other than white, such as milky white or silver, for example.

(21) In the foregoing embodiments, a plurality of cold cathode tubes is aligned with equal pitches. However, the invention also includes an arrangement in which the cold cathode tubes are aligned with unequal pitches. In that case, the cold cathode tubes are preferably arranged such that the density of the cold cathode tubes is higher at the center of the screen and is lower at the ends of the screen.

(22) In the foregoing embodiments, the cold cathode tubes, a kind of a discharge tube (fluorescent tube), are used as a light source. Alternatively, other kinds of discharge tubes, such as hot cathode tube, mercury lamp, or the like, may be used, for example. In addition, any other light source with the same temperature characteristics as those of discharge tubes, such as LEDs or the like, may be used.

(23) In the foregoing embodiments, the support member supporting the liquid crystal display module is a stand to be placed on an installation surface such as a floor surface.

However, the invention is also applicable to an arrangement in which the support member is a bracket for supporting the liquid crystal display module with respect to a wall surface along the vertical direction, or a ceiling surface.

(24) In the foregoing embodiments, the liquid crystal panel is placed in portrait orientation with the shorter side aligned with the vertical direction. However, the invention also includes an arrangement in which the liquid crystal panel is placed in landscape orientation with the longer side aligned with the vertical direction.

(25) In the foregoing embodiments, TFTs are used as the switching components of the liquid crystal display device. Preferably, switching components other than TFTs (such as thin-film diodes (TFD)) may be used in the liquid crystal display device. The liquid crystal display device may be configured for black-and-white display as well as color display.

(26) In the foregoing embodiments, the liquid crystal display device includes a liquid crystal panel as a display panel by way of example. Preferably, the present invention may be applied to display devices using other types of display panel.

(27) In the foregoing embodiments, the television receiver includes a tuner by way of example. Preferably, the present invention may be applied to display devices not including a tuner.

The invention claimed is:

1. A lighting device, comprising:
a light source;
a chassis housing the light source;
a reflection sheet disposed within the chassis and reflecting light; and
a heat insulator disposed between the chassis and the reflection sheet; wherein
the chassis is disposed such that a main plate surface thereof is aligned along a vertical direction;
the chassis includes at least an upper portion and a lower portion;
the heat insulator includes an upper portion overlapping area overlapping the upper portion of the chassis and a lower portion overlapping area overlapping the lower portion of the chassis, the upper portion overlapping area is smaller than the lower portion overlapping area;
the heat insulator has a shape such that an area thereof decreases from bottom to top in the vertical direction; and
the upper portion overlapping area is formed such that an area thereof gradually decreases from bottom to top in the vertical direction.

2. The lighting device according to claim 1, wherein the upper portion overlapping area includes a plurality of angled portions having edges angled relative to the vertical direction, the angled portions being arranged along a direction crossing the vertical direction and parallel to each other.

3. The lighting device according to claim 2, wherein the angled portions are arranged at substantially equal intervals.

4. The lighting device according to claim 1, wherein the heat insulator is made of a foamed resin material.

5. The lighting device according to claim 1, wherein the reflection sheet has a surface in a white-based color.

6. The lighting device according to claim 1, wherein the light source is a cold cathode tube.

7. A display device comprising:
the lighting device according to claim 1; and
a display panel configured to provide a display using light from the lighting device.

8. The display device according to claim 7, further comprising:
an exterior member configured to hold the lighting device and the display panel, the exterior member including at least an upper portion and a lower portion, and having heat release holes with openings, an area of the openings in the upper portion is smaller than an area of the openings in the lower portion; and
a support member supporting the chassis such that the main plate surface of the chassis is aligned with the vertical direction.

9. The display device according to claim 8, wherein the area of the openings of the heat release holes decreases from bottom to top in the vertical direction.

10. The display device according to claim 9, wherein the heat release holes are formed in a substantially same shape a number of the heat release holes decreasing from bottom to top in the vertical direction.

11. The display device according to claim 7, wherein the display panel is a liquid crystal panel including liquid crystals sealed between a pair of glass substrates.

12. A television receiver comprising the display device according to claim 7.

13. A lighting device, comprising:
a light source;
a chassis housing the light source;
a reflection sheet disposed within the chassis and reflecting light; and
a heat insulator disposed between the chassis and the reflection sheet; wherein
the chassis is disposed such that a main plate surface thereof is aligned along a vertical direction;
the chassis includes at least an upper portion and a lower portion;
the heat insulator includes an upper portion overlapping area overlapping the upper portion of the chassis and a lower portion overlapping area overlapping the lower portion of the chassis, the upper portion overlapping area is smaller than the lower portion overlapping area;
the heat insulator has a shape such that an area thereof decreases from bottom to top in the vertical direction; and
the upper portion overlapping area is formed such that an area thereof decreases stepwise from bottom to top in the vertical direction.

14. The lighting device according to claim 13, wherein the upper portion overlapping area has through holes such that an opening area of the upper portion overlapping area increases stepwise from bottom to top in the vertical direction.

15. The lighting device according to claim 14, wherein the through holes are formed in a substantially same shape and arranged such that a number of the through holes increases from bottom to top in the vertical direction.

16. The lighting device according to claim 14, wherein the through holes are arranged so as to overlap the light source.

17. The lighting device according to claim 14, wherein the through holes are arranged in lines perpendicular to the vertical direction.

18. A lighting device, comprising:
a light source;
a chassis housing the light source;
a reflection sheet disposed within the chassis and reflecting light; and
a heat insulator disposed between the chassis and the reflection sheet; wherein
the chassis has a bottom plate disposed on a side opposite to a light output side with respect to the light source;

the reflection sheet and the heat insulator are disposed so as to extend over a substantially entire area of the bottom plate;

the chassis has a side plate rising from the bottom plate toward the light output side, and the reflection sheet and the heat insulator have bottom portions disposed along the bottom plate and rising portions rising from the respective bottom portion toward the light output side and disposed along the side plate;

the chassis has a receiving plate jutting outward from a distal end of the side plate; and the reflection sheet and the heat insulator have extending portions extending from an edge of the distal end along the receiving plate.

19. The lighting device according to claim 18, wherein the heat insulator includes portions arranged in areas overlapping the light source.

20. The lighting device according to claim 18, further comprising a holding member holding the reflection sheet and the heat insulator between the holding member and the chassis.

21. The lighting device according to claim 20, wherein
the holding member is provided with a light source holding portion configured to hold the light source.

22. The lighting device according to claim 20, further comprising an optical member arranged on the light output side with respect to the light source so as to face the light source, wherein
the holding member includes a support portion supporting the optical member from a side opposite to the light output side.

* * * * *